United States Patent
Osawa et al.

(10) Patent No.: US 11,726,615 B2
(45) Date of Patent: Aug. 15, 2023

(54) TOUCH PANEL DEVICE, OPERATION IDENTIFICATION METHOD, AND STORAGE MEDIUM STORING OPERATION IDENTIFICATION PROGRAM

(71) Applicant: Mitsubishi Electric Corporation, Tokyo (JP)

(72) Inventors: Sohei Osawa, Tokyo (JP); Yuichi Sasaki, Tokyo (JP); Akihito Yamamoto, Tokyo (JP); Kentaro Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/590,168

(22) Filed: Feb. 1, 2022

(65) Prior Publication Data
US 2022/0155901 A1 May 19, 2022

Related U.S. Application Data

(63) Continuation of application No. PCT/JP2019/034687, filed on Sep. 4, 2019.

(51) Int. Cl.
*G06F 3/041* (2006.01)

(52) U.S. Cl.
CPC .. *G06F 3/0418* (2013.01); *G06F 2203/04105* (2013.01)

(58) Field of Classification Search
CPC ......... G06F 3/0418; G06F 2203/04105; G06F 2203/04103
See application file for complete search history.

(56) References Cited

U.S. PATENT DOCUMENTS

2016/0231868 A1 8/2016 Saiki
2016/0357297 A1 12/2016 Picciotto et al.

FOREIGN PATENT DOCUMENTS

JP 2016-146035 A 8/2016

OTHER PUBLICATIONS

International Search Report, issued PCT/JP2019/034687, dated Oct. 8, 2019.
Written Opinion of the International Searching Authority, issued PCT/JP2019/034687, dated Oct. 8, 2019.
Office Action dated Oct. 25, 2022 in counterpart German Patent Application No. 112019007585.3 with an English Translation.

*Primary Examiner* — Michael Pervan
(74) *Attorney, Agent, or Firm* — Birch, Stewart, Kolasch & Birch, LLP

(57) ABSTRACT

A touch panel device includes processing circuitry to generate coordinate information indicating a position of a touch operation; to generate a pressing value corresponding to pressing force applied to an operation surface of a touch panel; to classify the positions of touch operations included in operation logs each being data including the coordinate information and information indicating the pressing value into groups and to determine group regions respectively corresponding to the groups; to determine a threshold value of the pressing value in each of the group regions based on the operation logs; and to judge that the touch operation is a depressing operation with pressing force if the pressing value is greater than or equal to the threshold value and to judge that the touch operation is a normal touch operation other than the depressing operation if the pressing value is less than the threshold value.

9 Claims, 16 Drawing Sheets

FIG. 9A  AT TIME OF OPERATION ON OPERATION BUTTON 71
IN NORMAL TOUCH OPERATION REGION

| OPERATION COUNT | PRESSING VALUE | OPERATION JUDGMENT | NORMAL TOUCH OPERATION | DEPRESSING OPERATION | OPERATION REGION | ... |
|---|---|---|---|---|---|---|
| FIRST | 61 | DEPRESSING OPERATION | 0 | 1 | DEPRESSING REGION ? | ... |
| SECOND | 58 | DEPRESSING OPERATION | 0 | 1 | DEPRESSING REGION ? | ... |
| THIRD | 60 | DEPRESSING OPERATION | 0 | 1 | NORMAL TOUCH OPERATION | ... |

FIG. 9B  AT TIME OF OPERATION ON OPERATION BUTTON 72
IN DEPRESSING OPERATION REGION

| OPERATION COUNT | PRESSING VALUE | OPERATION JUDGMENT | NORMAL TOUCH OPERATION | DEPRESSING OPERATION | OPERATION REGION | ... |
|---|---|---|---|---|---|---|
| FIRST | 85 | DEPRESSING OPERATION | 0 | 1 | DEPRESSING REGION | ... |

FIG. 9C  AT TIME OF OPERATION ON OPERATION BUTTON 73
IN NORMAL TOUCH OPERATION REGION

| OPERATION COUNT | PRESSING VALUE | OPERATION JUDGMENT | NORMAL TOUCH OPERATION | DEPRESSING OPERATION | OPERATION REGION | ... |
|---|---|---|---|---|---|---|
| FIRST | 61 | DEPRESSING OPERATION | 1 | 0 | NORMAL TOUCH REGION | ... |
| SECOND | 59 | DEPRESSING OPERATION | 1 | 0 | NORMAL TOUCH REGION | ... |
| THIRD | 63 | DEPRESSING OPERATION | 1 | 0 | NORMAL TOUCH REGION | ... |

FIG. 9D  AT TIME OF OPERATION ON OPERATION BUTTON 74
IN DEPRESSING OPERATION REGION

| OPERATION COUNT | PRESSING VALUE | OPERATION JUDGMENT | NORMAL TOUCH OPERATION | DEPRESSING OPERATION | OPERATION REGION | ... |
|---|---|---|---|---|---|---|
| FIRST | 89 | DEPRESSING OPERATION | 0 | 1 | DEPRESSING REGION | ... |
| SECOND | 91 | DEPRESSING OPERATION | 0 | 1 | DEPRESSING REGION | ... |

NORMAL TOUCH OPERATION

DEPRESSING OPERATION

NORMAL TOUCH OPERATION

DEPRESSING OPERATION

TOUCH PANEL DEVICE, OPERATION IDENTIFICATION METHOD, AND STORAGE MEDIUM STORING OPERATION IDENTIFICATION PROGRAM

CROSS-REFERENCE TO RELATED APPLICATION

This application is a continuation application of International Application No. PCT/JP2019/034687 having an international filing date of Sep. 4, 2019, the disclosure of which is incorporated herein by reference in its entirety.

BACKGROUND OF THE INVENTION

1. Field of the Invention

The present disclosure relates to a touch panel device, an operation identification method and a storage medium storing an operation identification program.

2. Description of the Related Art

A touch panel device having a pressure detection function and capable of detecting the pressing force of a touch operation is in practical use. This touch panel device recognizes a touch operation with pressing force less than a threshold value as a normal touch operation, and recognizes a touch operation with pressing force greater than or equal to the threshold value as a depressing operation (referred to also as a "depressing touch operation"). However, there are cases where this touch panel device erroneously judges a touch operation performed intending the normal touch operation as the depressing operation or erroneously judges a touch operation performed intending the depressing operation as the normal touch operation.

To reduce the erroneous judgments, there has been proposed a technology in which the touch panel is divided into a plurality of predetermined regions and the threshold value for the judgment on the depressing operation is set in regard to each of the regions. See Japanese Patent Application Publication No. 2016-146035 (Patent Reference 1), for example.

However, since the touch panel device described in the Patent Reference 1 sets the threshold value for the judgment on the depressing operation in regard to each of the predetermined regions, the touch panel device can make an erroneous judgment on whether a touch operation is a normal touch operation or a depressing operation in a case where the pressing force threshold value varies in each region and in a case where one operation button extends across a plurality of regions. There is a problem in that the erroneous judgment deteriorates the operability of the touch panel device.

SUMMARY OF THE INVENTION

An object of the present disclosure, which has been made to resolve the above-described problem, is to provide a touch panel device having high operability and an operation identification method and an operation identification program capable of increasing the operability.

A touch panel device of the present disclosure includes processing circuitry to generate coordinate information indicating a position of a touch operation performed on an operation surface of a touch panel based on a signal outputted from the touch panel due to the touch operation; to generate a pressing value corresponding to pressing force applied to the operation surface of the touch panel by the touch operation; to classify the positions of a plurality of touch operations included in operation logs, each being data including the coordinate information and information indicating the pressing value, collected and stored in a storage into a plurality of groups and to determine group regions respectively corresponding to the plurality of groups; to determine a threshold value of the pressing value in each of the plurality of group regions based on the operation logs; and to judge that the touch operation is a depressing operation with pressing force if the pressing value is greater than or equal to the threshold value and to judge that the touch operation is a normal touch operation other than the depressing operation if the pressing value is less than the threshold value.

An operation identification method of the present disclosure includes generating coordinate information indicating a position of a touch operation performed on an operation surface of a touch panel based on a signal outputted from the touch panel due to the touch operation; generating a pressing value corresponding to pressing force applied to the operation surface of the touch panel by the touch operation; collecting and storing operation logs each being data including the coordinate information and information indicating the pressing value; classifying the positions of a plurality of touch operations included in the operation logs into a plurality of groups and determining group regions respectively corresponding to the plurality of groups; determining a threshold value of the pressing value in each of the plurality of group regions based on the operation logs; and judging that the touch operation is a depressing operation with pressing force if the pressing value is greater than or equal to the threshold value and judging that the touch operation is a normal touch operation other than the depressing operation if the pressing value is less than the threshold value.

By using the device or method of the present disclosure, whether a touch operation is a normal touch operation or a depressing operation can be judged accurately and the operability of the touch panel can be increased.

BRIEF DESCRIPTION OF THE DRAWINGS

In the accompanying drawings,

FIGS. 9A to 9D are diagrams showing examples of operation logs due to touch operations on operation buttons;

DETAILED DESCRIPTION OF THE INVENTION

Touch panel devices, operation identification methods and a non-transitory computer-readable storage medium for storing an operation identification program according to embodiments of the present disclosure will be described below with reference to the drawings. The following embodiments are just examples and a variety of modifications are possible within the scope of the present disclosure.

(1) First Embodiment

Figure 1:
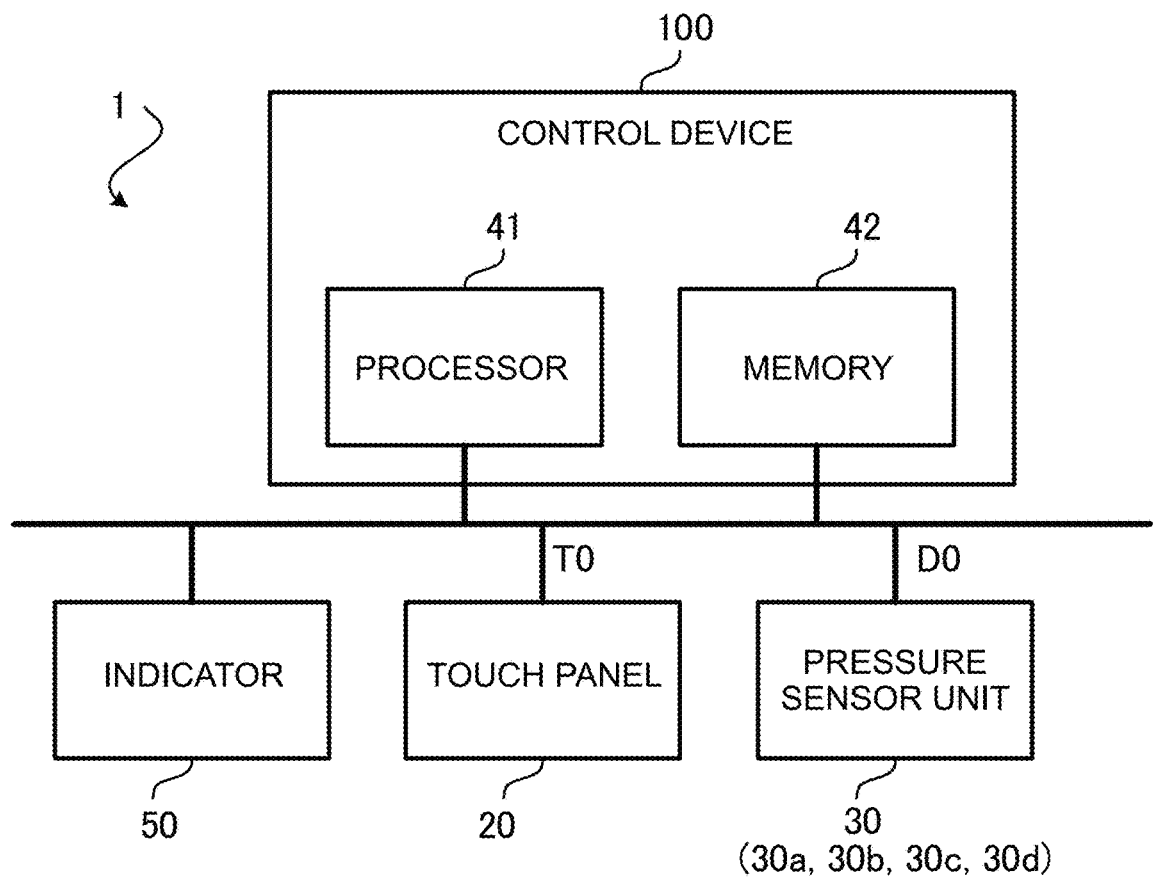
FIG. 1 is a diagram showing an example of the hardware configuration of a touch panel device according to a first embodiment of the present disclosure.

FIG. 1 is a diagram showing an example of the hardware configuration of a touch panel device 1 according to a first embodiment. As shown in FIG. 1, the touch panel device 1 includes a touch panel 20, a pressure sensor unit 30, a display device 50 and a control device 100. The touch panel 20 has an operation surface on which touch operations are performed by a user. The display device 50 is, for example, a liquid crystal display arranged in superimposition with the touch panel 20. The display device 50 may also be formed integrally with the touch panel 20. The display device 50 is controlled by the control device 100 and displays an operation screen or the like. The operation screen is a user interface (UI) screen including objects as operation components such as icons. The touch panel 20 is, for example, a capacitive touch panel in which electrostatic capacitance of a part of the operation surface in contact with a conductor changes. The touch panel 20 outputs touch information T0, as position information corresponding to a touch operation, to the control device 100.

The pressure sensor unit 30 includes one or more pressure sensors. In the first embodiment, the pressure sensor unit 30 includes four pressure sensors 30a, 30b, 30c and 30d. When a depressing operation as a touch operation of applying pressing force to the operation surface of the touch panel 20 is performed by the user, the pressure sensor unit 30 outputs a detection signal D0, as an electric signal based on the pressing force applied to the touch panel 20, to the control device 100.

The control device 100 includes a processor 41 as an information processing unit and a memory 42 as a storage unit for storing information. The storage unit may be a non-transitory computer-readable storage medium (i.e., recording medium) storing a program such as an operation identification program for executing an operation identification method which will be described later. The control device 100 is a computer, for example. A program has been installed in the memory 42. The program is installed via a network or from a storage medium storing information, for example. The program may include the operation identification program for executing the operation identification method. The processor 41 controls the operation of the whole of the touch panel device 1 by executing the program stored in the memory 42. The whole or part of the control device 100 may be processing circuitry, which is formed with a "system on chip" as a control circuit made of semiconductor integrated circuits, or the like, for example. The memory 42 may include various types of storages such as a semiconductor storage device, a hard disk drive and a device that records information in a removable record medium.

The control device 100 executes a process corresponding to the touch operation performed on the operation surface of the touch panel 20. The control device 100 is capable of distinguishing between a normal touch operation as a touch operation of touching the operation surface of the touch panel 20 with pressing force less than a predetermined threshold value and a depressing operation (referred to also as a "depressing touch operation") as a touch operation of touching the operation surface of the touch panel 20 with pressing force greater than or equal to the threshold value. Specifically, the control device 100 executes a process based on the change in the electrostatic capacitance in the touch panel 20 corresponding to the touch operation performed on the operation surface of the touch panel 20 and the detection signal D0 outputted from the pressure sensor unit 30 corresponding to the pressing force applied to the operation surface. For example, the control device 100 transmits a control signal corresponding to the touch operation performed on the operation surface of the touch panel 20 to a different apparatus connected to the touch panel device 1 or a different apparatus capable of communicating with the touch panel device 1. The different apparatus is a control target apparatus, such as a production facility, a vehicle or a household electrical appliance, for example.

Figure 2:
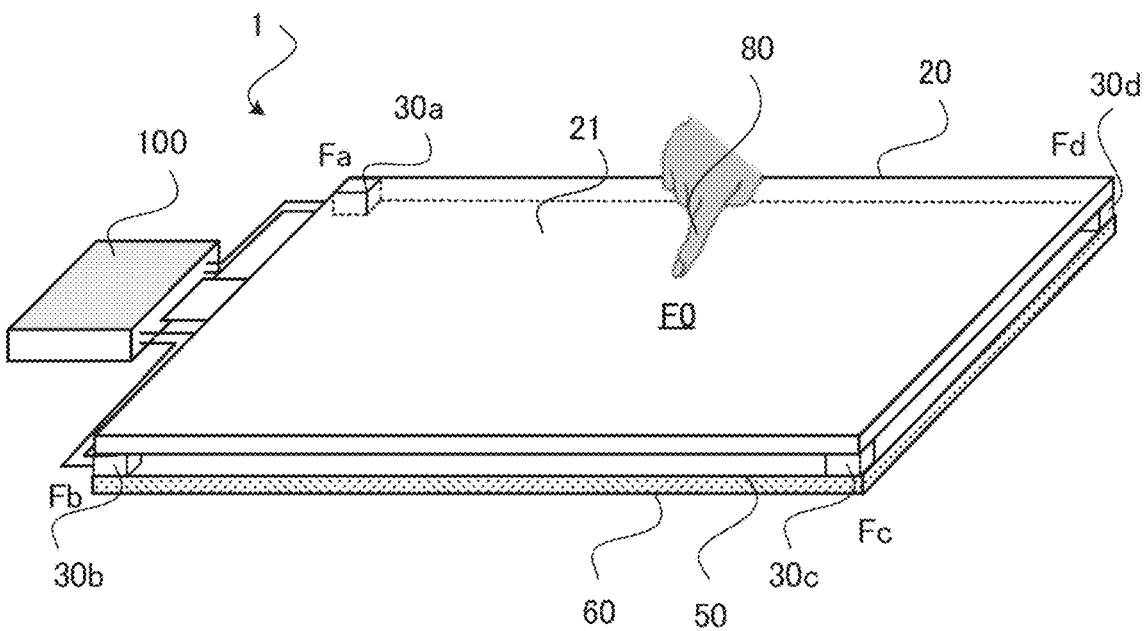
FIG. 2 is a perspective view schematically showing internal structure of the touch panel device according to the first embodiment.

FIG. 2 is a perspective view schematically showing an example of internal structure of the touch panel device 1. As shown in FIG. 2, the touch panel device 1 includes a substrate 60 that is formed integrally with the display device 50 and the pressure sensors 30a to 30d that support the touch panel 20 on the substrate 60. The substrate 60 may also be a part of a housing of the touch panel device 1. Further, while the control device 100 is drawn outside the touch panel 20 in FIG. 2, the control device 100 may also be a part of the substrate 60 or a part of a circuit board mounted on the substrate 60. In FIG. 2, the pressure sensors 30a to 30d respectively support four corner parts of the touch panel 20. The pressure sensors 30a to 30d in FIG. 2 are formed with elastic material and constitute the pressure sensor unit 30 shown in FIG. 1. Incidentally, the pressure sensors 30a to 30d may also be arranged to support the touch panel 20 at positions other than the corner parts. Further, the plan-view shape of the touch panel 20 can be a shape other than a quadrangle. Furthermore, the number of the pressure sensors supporting the touch panel 20 can also be three or less, or five or more.

As shown in FIG. 2, the touch panel 20 has an operation surface 21 that receives a touch operation performed by the user. When a conductor is in contact with the operation surface 21, the capacitance of the part in contact with the conductor changes. The conductor is, for example, a finger 80 of the user or an operation assistance tool such as a stylus pen. The control device 100 detects the capacitance at each position on the operation surface 21 and thereby acquires the position of the part in contact with the conductor, i.e., two-dimensional coordinates on the operation surface 21. Namely, the control device 100 calculates position coordinates indicating the position of the conductor contact part on the operation surface 21 based on the capacitance at each position on the operation surface 21 of the touch panel 20. The conductor contact part is, for example, a part in which the capacitance is higher than predetermined reference capacitance. The position coordinates indicating the position of the conductor contact part are referred to also as "capacitance coordinates".

The pressing force applied to the operation surface 21 of the touch panel 20 is detected by the pressure sensors 30a to 30d. The pressure sensors 30a to 30d output the detection signal D0 as a pressure detection signal corresponding to the pressing force FO applied to the operation surface 21 and the pressing position. The control device 100 is capable of calculating the pressing force FO by adding up values Fa to Fd indicated by the detection signal D0 outputted from the pressure sensors 30a to 30d. Further, the control device 100 is capable of calculating position coordinates indicating the pressing position on the operation surface 21 based on the values Fa to Fd indicated by the detection signal D0. The position coordinates calculated based on the detection signal D0, namely, the coordinates of the position where the depressing operation is performed, are referred to also as "pressure coordinates".

Figures 3A, 3B:
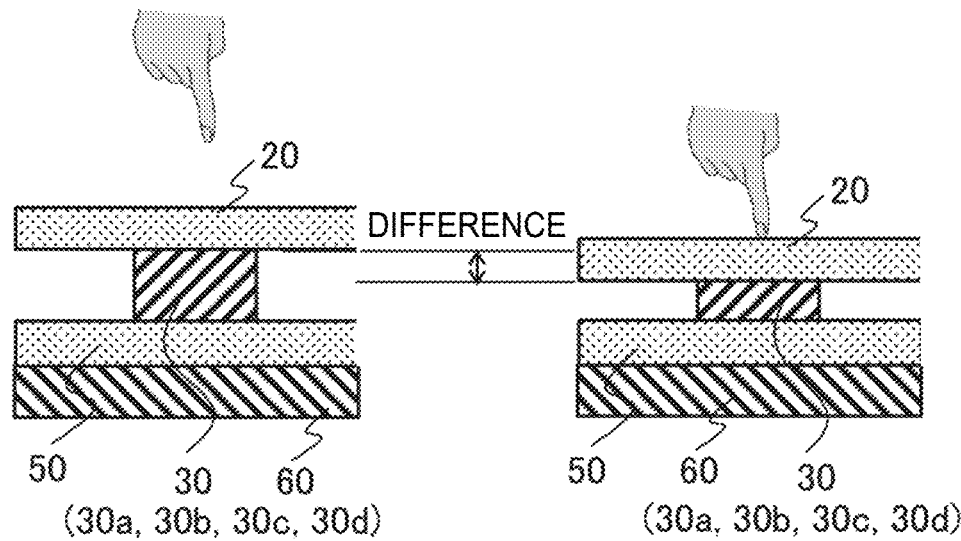
FIGS. 3A and 3B are cross-sectional views schematically showing a pressure sensor of the touch panel device shown in FIG. 2.

FIGS. 3A and 3B are cross-sectional views schematically showing the pressure sensor of the pressure sensor unit 30 of the touch panel device 1 shown in FIG. 2. FIG. 3A shows a state before the depressing operation and FIG. 3B shows a state in the middle of the depressing operation. In this example, the pressure sensors 30a to 30d constituting the pressure sensor unit 30 are formed with elastic material and support the touch panel 20. As shown in FIG. 3B, by the depressing operation, the pressure sensor 30a-30d is elastically deformed and becomes thinner. Further, as shown in FIG. 3A, by stopping the depressing operation, the pressure sensors 30a-30d are restored to the original state and become thick. As shown in FIG. 3B, the compressed pressure sensors 30a-30d output the detection signal D0 indicating a value corresponding to the difference in the thickness.

Figures 4A, 4B:
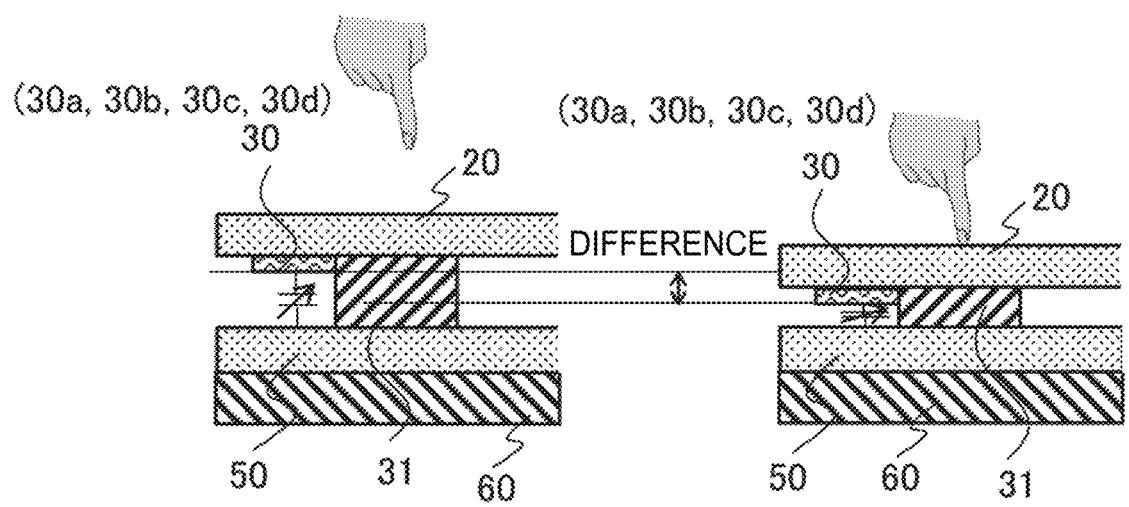
FIGS. 4A and 4B are cross-sectional views schematically showing another example of the pressure sensor of the touch panel device.

FIGS. 4A and 4B are cross-sectional views schematically showing another example of the pressure sensor of the pressure sensor unit 30 of the touch panel device 1. FIG. 4A shows a state before the depressing operation and FIG. 4B shows a state in the middle of the depressing operation. In this example, the pressure sensors 30a to 30d constituting the pressure sensor unit 30 are configured separately from support parts 31 made of elastic material and supporting the touch panel 20. In this example, the pressure sensors 30a-30d detect the capacitance changed by the depressing operation and outputs the detection signal D0 based on the capacitance. When the support part 31 is elastically deformed to be thinner by the depressing operation as shown in FIG. 4B, the capacitance detected by the pressure sensors 30a-30d increase. Further, when the support part 31 is restored to the original state to be thick by stopping the depressing operation as shown in FIG. 4A, the capacitance detected by the pressure sensor 30a-30d decreases and returns to the initial value. As shown in FIG. 4B, the pressure sensors 30a-30d output the detection signal D0 indicating a value corresponding to the thickness difference of the compressed support part 31.

Figure 5:
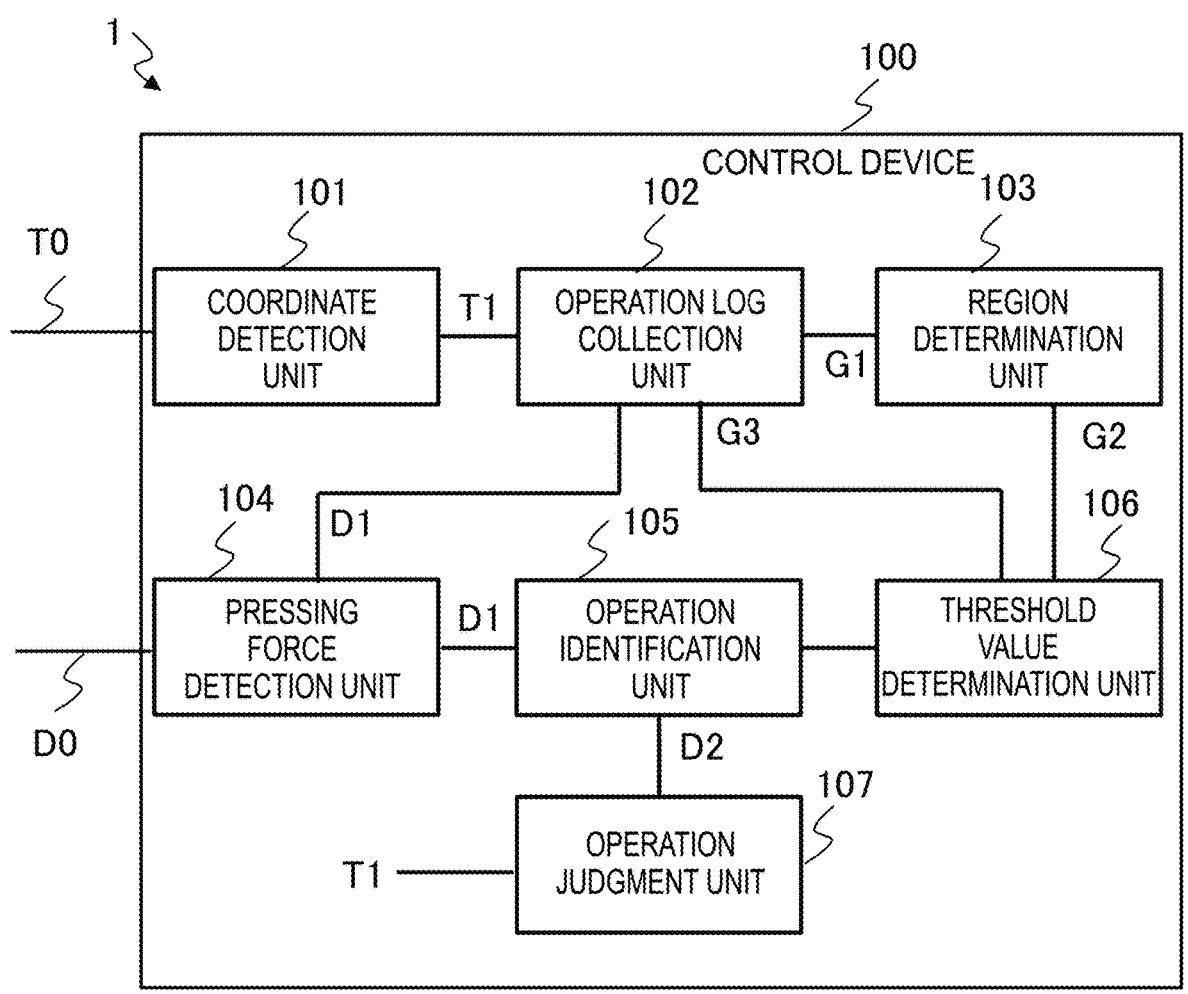
FIG. 5 is a functional block diagram schematically showing the configuration of the touch panel device according to the first embodiment.

FIG. 5 is a functional block diagram schematically showing the configuration of the touch panel device 1 according to the first embodiment. In FIG. 5, each component identical or corresponding to a component shown in FIG. 1 is assigned the same reference character as in FIG. 1. As shown in FIG. 5, the control device 100 includes a coordinate detection unit 101, an operation log collection unit 102, a region determination unit 103, a pressing force detection unit 104, an operation identification unit 105, a threshold value determination unit 106 and an operation judgment unit 107.

The coordinate detection unit 101 generates coordinate information T1 based on the touch information T0 as a signal outputted from the touch panel 20 due to the touch operation. Specifically, the coordinate detection unit 101 detects the presence/absence of contact of a conductor with the operation surface 21 by detecting the capacitance at each position on the operation surface 21 of the touch panel 20. The coordinate detection unit 101 calculates the coordinate information T1 indicating the coordinates of the conductor contact part as the part in which the detection value of the capacitance is higher than the predetermined reference capacitance. The coordinate detection unit 101 supplies the coordinate information T1 to the operation log collection unit 102 and the operation judgment unit 107.

The pressing force detection unit 104 outputs information indicating a pressing value D1 corresponding to the pressing force FO applied to the operation surface 21 of the touch panel 20 by the touch operation. Specifically, the pressing force detection unit 104 receives the detection signal D0 outputted from the pressure sensors 30a to 30d constituting the pressure sensor unit 30 and outputs information indicating the pressing value D1 based on the detection signal D0. When the values indicated by the detection signal D0 outputted from the pressure sensors 30a to 30d are Fa to Fd, the pressing value D1 is the total value, the average value or the like of the values Fa to Fd.

The operation log collection unit 102 includes a storage unit for storing information and collects and stores operation logs each being data including the coordinate information T1 and the information indicating the pressing value D1. However, the storage unit can also be a storage outside the operation log collection unit 102.

The region determination unit 103 receives the operation logs G1 stored in the operation log collection unit 102, classifies the positions of a plurality of touch operations included in the operation logs G1 into a plurality of groups by means of clustering, and determines a plurality of group regions corresponding to the plurality of groups. Details of the method of determining the group regions will be described later.

The threshold value determination unit 106 determines the pressing force threshold value TH in each of the plurality of group regions based on operation logs G3 received from the operation log collection unit 102 and information G2 indicating the group regions received from the region determination unit 103. Details of the method of determining the threshold value TH will be described later.

The operation identification unit 105 identifies whether the touch operation is the normal touch operation performed with pressing force less than the threshold value TH or the depressing operation performed with pressing force greater than or equal to the threshold value TH. The operation identification unit 105 may also set a plurality of threshold values and thereby distinguish the touch operation into three or more types of operations, such as the normal touch operation, the depressing operation and a strong depressing operation.

The operation judgment unit 107 judges operation information inputted by the touch operation based on the coordinate information T1 generated by the coordinate detection unit 101, the pressing value D1 generated by the pressing force detection unit 104, and the result D2 of the identification by the operation identification unit 105. The operation judgment unit 107 executes a process corresponding to the touch operation. For example, the operation judgment unit 107 outputs a control signal corresponding to the touch operation to the control target apparatus (not shown). The operation judgment unit 107 may have a function of providing the display device 50 with an image signal or an audio signal corresponding to the touch operation.

Figure 6:
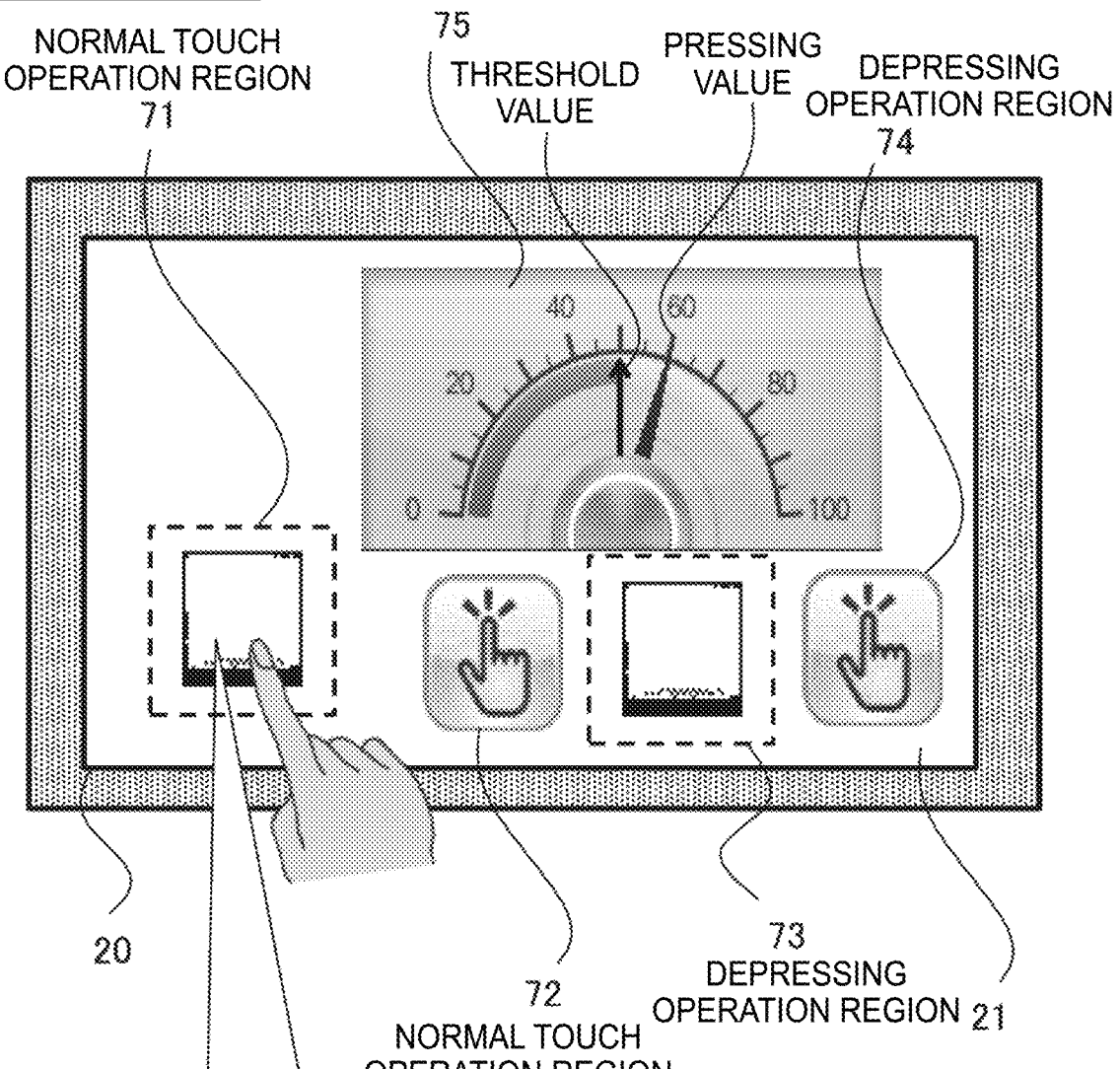
FIG. 6 is a diagram showing an example of a UI screen and a touch operation.
Figure 7:
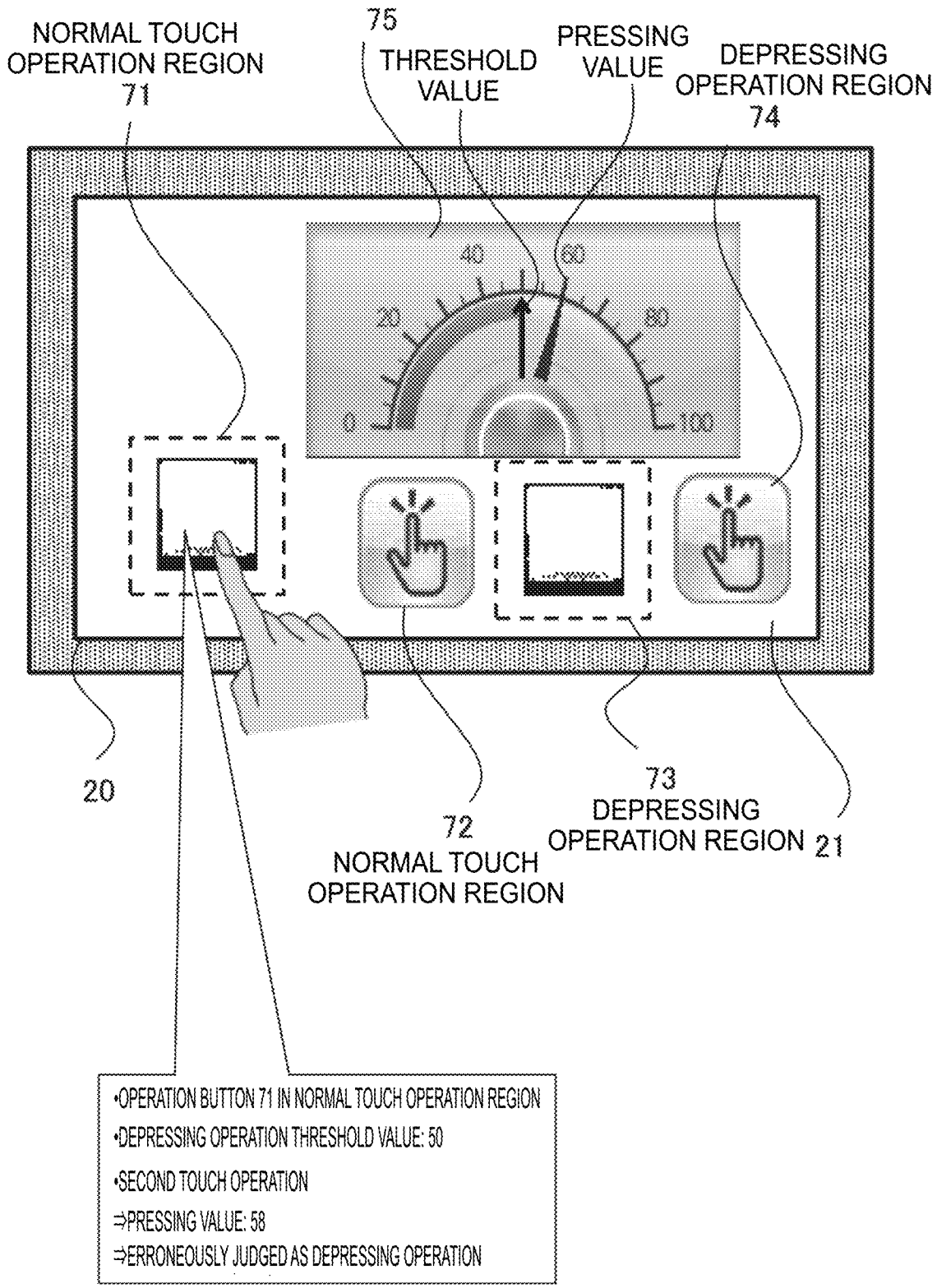
FIG. 7 is a diagram showing an example of the UI screen and the touch operation.
Figure 8:
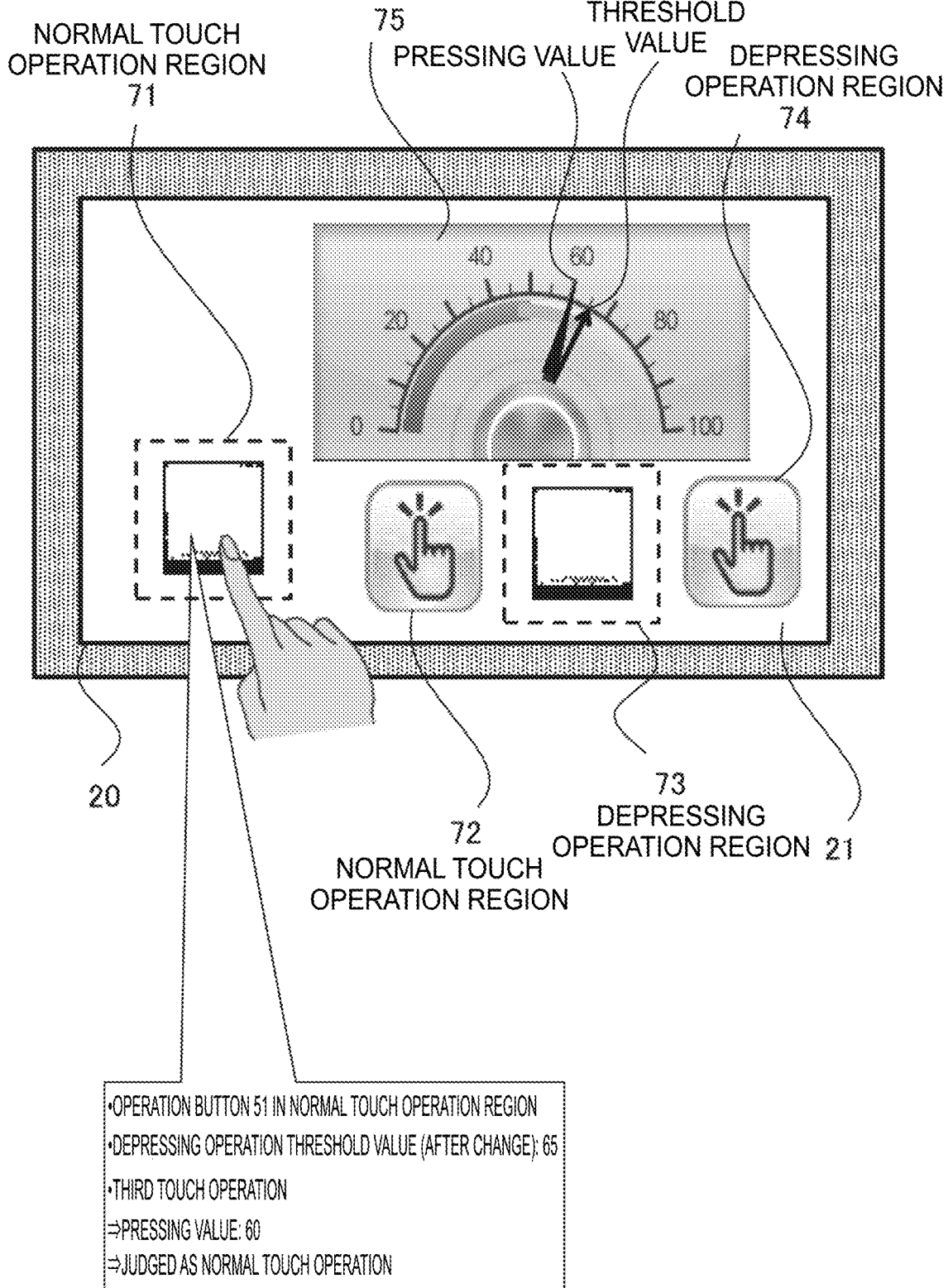
FIG. 8 is a diagram showing an example of the UI screen and the touch operation.

FIG. 6 to FIG. 8 are diagrams showing examples of the UI screen and the touch operation. The UI screen is formed with operation buttons 71 and 73 as input objects for the normal touch operation, operation buttons 72 and 74 as input objects for the depressing operation, and an indicator 75 as a display object that displays the pressing value and the depressing operation threshold value. FIG. 6 to FIG. 8 show a case where the threshold value is changed (FIG. 8) when the threshold value has been set low in a group region including the operation button 71 in a normal touch operation region and a normal touch operation is judged as a depressing operation (FIG. 6 and FIG. 7). In the case where a normal touch operation is judged as a depressing operation due to a low threshold value of the touch panel 20, an operation corresponding to the present pressing value is estimated based on operation logs of operations and pressing values in other operation regions and the threshold value is changed properly. FIGS. 9A to 9D are diagrams showing examples of operation logs due to touch operations on the operation buttons 71 to 74.

Figure 10:
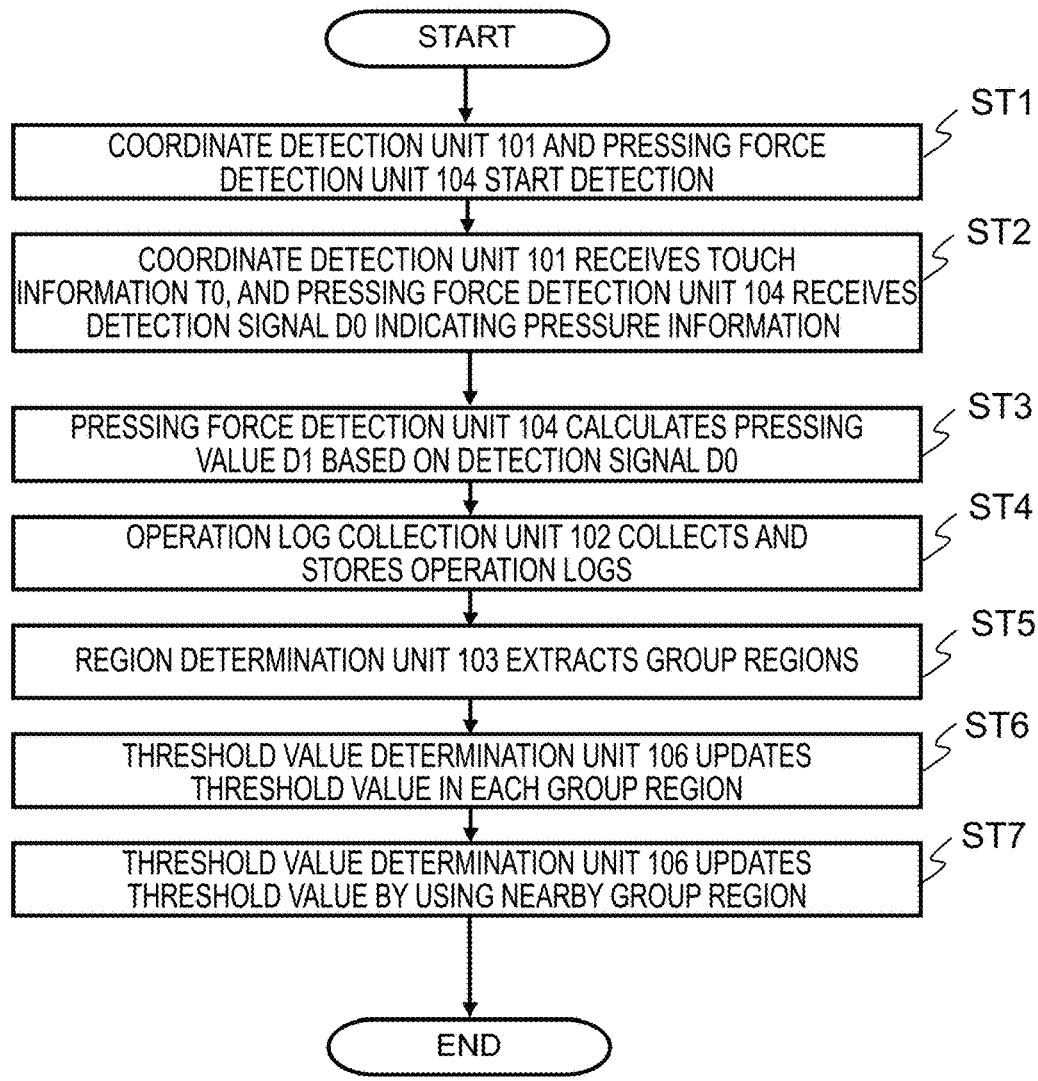
FIG. 10 is a flowchart showing the operation of the touch panel device according to the first embodiment.

FIG. 10 is a flowchart showing the operation of the touch panel device 1 according to the first embodiment.

(Step ST1)

In step ST1, the coordinate detection unit 101 and the pressing force detection unit 104 start detection processes.

(Step ST2)

In step ST2, the coordinate detection unit 101 receives the touch information T0 outputted from the touch panel 20. The touch information T0 includes, for example, touch coordinates as the coordinates of the touch position, condition of contact by the touch operation, a detection value of the capacitance at the touch spot, and so forth. Further, the pressing force detection unit 104 receives the detection signal D0 indicating pressure information and outputted from the pressure sensor unit 30.

(Step ST3)

In step ST3, the coordinate detection unit 101 generates the coordinate information T1 indicating the touch position on the touch panel 20 based on the touch information T0. The pressing force detection unit 104 calculates the pressing value D1 as pressure information indicating the pressing force FO applied to the touch panel 20 based on the detection signal D0.

(Step ST4)

In step ST4, the operation log collection unit 102 collects operation data and stores the collected operation data as operation logs.

Figure 11A:
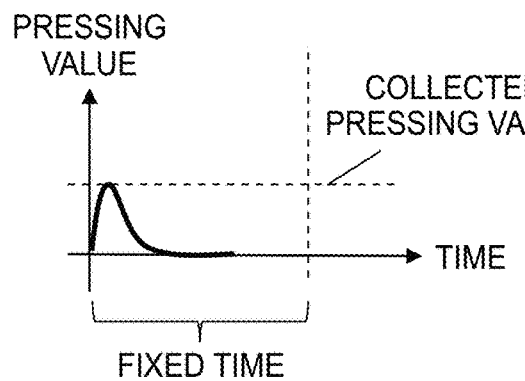
FIGS. 11A and 11B are diagrams showing operation logs collected by an operation log collection unit.
Figure 11B:
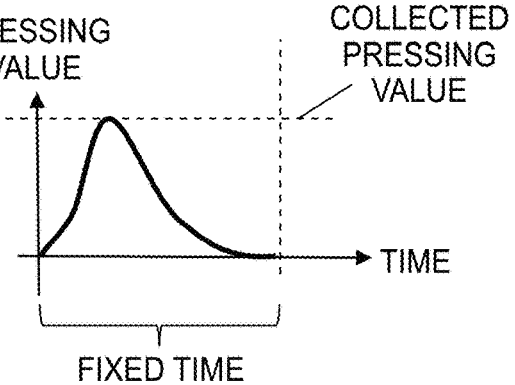

FIGS. 11A and 11B are diagrams showing collected operation logs. FIG. 11A shows time variation of the pressing value of the normal touch operation and FIG. 11B shows time variation of the pressing value of the depressing operation. For example, when there occurred an operation of separating a finger that made contact with the operation surface 21 of the touch panel 20 due to a touch operation from the operation surface 21 of the touch panel 20 within a predetermined fixed time, the operation log collection unit 102 collects the operation data of this operation and stores the collected operation data as an operation log. When a finger that made contact with the touch panel 20 due to a touch operation moves for a predetermined fixed distance or more, the operation log collection unit 102 may exclude the operation data of this operation from the operation logs. The operation log collection unit 102 collects and stores the maximum pressing value in a period from the start to the end of each touch operation and the touch coordinates at the time of detecting the maximum pressing value.

(Step ST5)

In step ST5, the region determination unit 103 classifies the touch coordinates in the operation logs stored in the operation log collection unit 102 into a plurality of groups (hereinafter referred to as "grouping") by means of hierarchical clustering, and generates the group regions as regions respectively including the groups.

Figure 12:
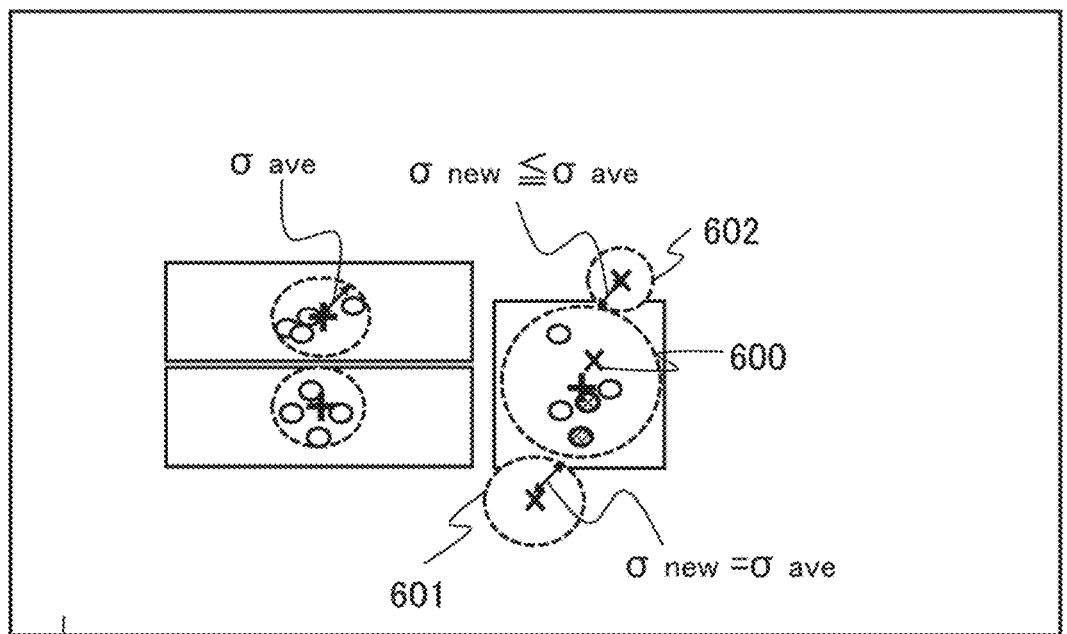
FIG. 12 is a diagram showing a process executed by a region determination unit.

FIG. 12 is a diagram showing a process executed by the region determination unit 103. The operation log collection unit 102 collects the operation logs until a predetermined fixed number of touch points, each being the position where a touch operation is performed (i.e., touch coordinates), are accumulated. When a fixed number of operation logs have been accumulated, the region determination unit 103 generates the group regions by executing the grouping by means of the hierarchical clustering. The distance between groups can be obtained by, for example, Ward's method known as agglomerative hierarchical clustering using the Euclidean distance in X and Y coordinates. The number of layers can be determined by using, for example, the upper tail method known as a cluster count automatic determination method. By the above-described process, a plurality of groups are obtained and a plurality of group regions are obtained.

Thereafter, the region determination unit 103 obtains a center position ($X_{ave}$, $Y_{ave}$) of each group and the standard deviation a of distances of touch coordinates belonging to each group from the central position and generates group regions corresponding to operation button regions. Each group region is, for example, a region in a circular shape having the center position ($X_{ave}$, $Y_{ave}$) as its center point and having the standard deviation a as its radius.

Upon the occurrence of a new touch point, the region determination unit 103 judges whether or not the new touch point is included in any one of the plurality of group regions. This judgment is referred to also as a "region judgment". When the new touch point is included in any one of the group regions, the region determination unit 103 updates the group region by updating the center position ($X_{ave}$, $Y_{ave}$) of the group and the standard deviation a of the distances of the touch coordinates belonging to each group from the central position. When the new touch point is included in none of the plurality of group regions, the region determination unit 103 defines a new group region including the new touch point. The center position of the new group region is the position of the new touch point.

New group regions 601 and 602 are shown in FIG. 12. The region determination unit 103 adjusts the size of each new group region to satisfy $\sigma_{new} \leq \sigma_{ave}$ so that the circular group region including the new group does not overlap with another circular group region. Here, $\sigma_{new}$ represents the standard deviation of touch coordinates included in the new group region, and $\sigma_{ave}$ represents the average of the standard deviations of touch coordinates included in other groups. In the example of FIG. 12, the new group region 602 satisfies the condition $\sigma_{new} \leq \sigma_{ave}$. Further, in the example of FIG. 12, $\sigma_{new} = \sigma_{ave}$ holds in regard to the new group region 601.

Each time an operation log included in a group region is detected, the region determination unit 103 updates the average coordinates $(X_{ave}, Y_{ave})$ indicating the center position of the group region and the standard deviation $\sigma_{ave}$.

When an overlap is detected in any one of the plurality of group regions after the update, the region determination unit 103 adjusts the standard deviation $\sigma$, that is, the radius of a group region, so that there is no overlap between group regions. The region determination unit 103 repeats the above-described process and thereby updates the group regions each time a touch point is obtained.

It is also possible for the region determination unit 103 to perform the grouping again on data of a predetermined number of operation logs by performing the hierarchical clustering at a time point when the operation logs have increased and the number of operation logs has reached the predetermined number for reclustering.

The region determination unit 103 may also perform calculation of the Euclidean distance in XYZ coordinates by use of the pressing value D1 represented as a Z coordinate in addition to the touch coordinates represented as the X and Y coordinates. However, it is desirable to use a Z coordinate using a properly weighted D1 since the Z-axis based on the pressing value D1 is not equivalent to the X-axis and the Y-axis of the touch coordinates. Further, the region determination unit 103 may calculate the distance between feature vectors, each formed with a plurality of feature values, by using the cosine distance, the Mahalanobis distance or the like instead of the Euclidean distance.

When the arrangement of operation buttons has been changed due to screen transition on the touch panel 20 or the like, there is a possibility of occurrence of a situation in which operation logs before the change and operation logs after the change coexist as data of the same group region. Further, even though operation target regions such as operation buttons can differ from each other in size, it is known that the operation target regions do not become larger than a certain size for layout reasons. Therefore, when the variance $\sigma^2$ exceeds a predetermined fixed value due to merging of two groups in the distance calculation in the hierarchical clustering, the region determination unit 103 may perform a process of imposing a penalty on the calculation value of the inter-group distance so that the inter-group distance will be obtained as a greater value.

Further, the region determination unit 103 may operate to previously set a maximum standard deviation $\sigma_{max}$ of a group region and to stop the clustering upon the appearance of a group region exceeding the maximum standard deviation $\sigma_{max}$.

Furthermore, the region determination unit 103 may employ a clustering method using modularity, as a method using a graph structure in which the touch points are regarded as apices (i.e., nodes) and touch points within a certain distance are regarded as a side (i.e., edge), or the k-means method instead of the clustering by using the distance.

Moreover, in the step ST5 in FIG. 10, when there occurs a stroking operation of keeping on moving a finger along the operation surface 21 of the touch panel 20, the operation log collection unit 102 may make the region judgment in regard to each of a plurality of touch points in the region where the stroking operation is performed, and when a touch point is in a group region, may update the average $\sigma_{ave}$ of the standard deviations of the touch coordinates belonging to the group based on the pressing value at the touch point and store the updated average $\sigma_{ave}$.

(Step ST6)

In step ST6 in FIG. 10, the threshold value determination unit 106 sets a new threshold value in each group region based on the pressing values of normal touch operation regions as group regions and the pressing values of depressing operation regions as group regions. When collecting M operation logs of normal touch operations or M operation logs of depressing touch operations, the threshold value determination unit 106 estimates the average $\mu$ and $3\sigma$ of Gaussian distribution of the pressing value based on the tendency of frequency distribution of the pressing value, and updates the threshold value as the boundary between the normal touch operation and the depressing operation. Here, $\sigma$ represents the standard deviation and M represents a positive integer.

Figure 13A:
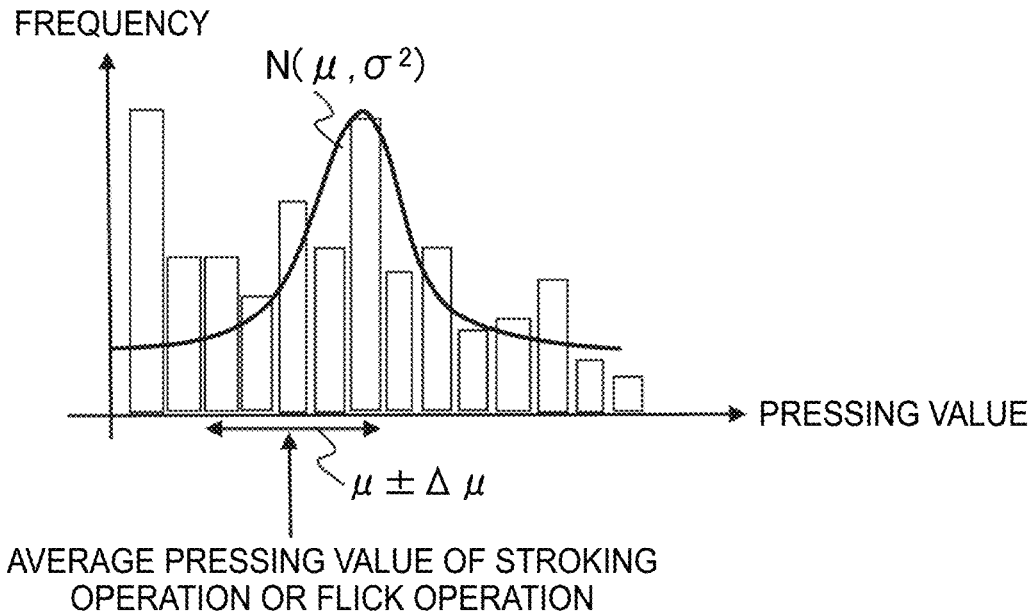
FIGS. 13A and 13B are diagrams showing frequency distributions of a pressing value.
Figure 13B:
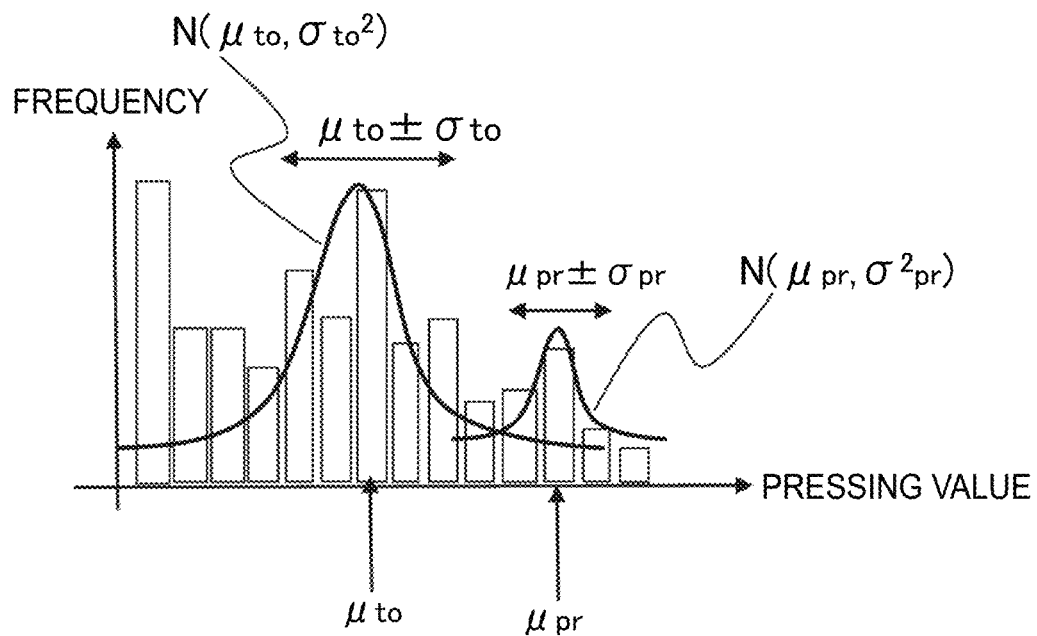

However, there is a possibility that normal touch operations and depressing operations coexist in the touch operations on each group region. Since the pressing value of the touch operation tends to vary from user to user, there is a possibility that operation logs as a mixture of the distribution of normal touch operations and the distribution of depressing operations are obtained. Further, it is presumed that the total number of operation logs of depressing operations is smaller than the total number of operation logs of normal touch operations. In this case, pressing value frequency distributions like those shown in FIGS. 13A and 13B are obtained.

To distinguish between normal touch operations and depressing operations, the threshold value determination unit 106 sets a pressing value at the time of a normal touch operation without depressing, such as the stroking operation or a flick operation, as a reference value. The threshold value determination unit 106 averages pressing values within a fixed range ($\pm \Delta \mu$) based on the reference value and obtains a Gaussian distribution $N(\mu_{to}, \sigma_{to}^2)$ (shown in FIG. 13A) fitting the shape of the pressing value frequency distribution. Incidentally, $N(\mu, \sigma^2)$ represents a Gaussian distribution having the average $\mu$ and the variance $\sigma^2$.

Then, the threshold value determination unit 106 searches a range higher than $\mu_{to}$ (shown in FIG. 13B) to check whether or not there is a pressing value deviating from the Gaussian distribution. By this search, the threshold value determination unit 106 obtains $\mu_{pr}$ (shown in FIG. 13B) whose pressing value frequency most differs from the value of the Gaussian distribution $N(\mu_{to}, \sigma_{to}^2)$.

Subsequently, after obtaining $\mu_{pr}$, the threshold value determination unit 106 adjusts the values of the standard deviation $\sigma_{to}$ and a standard deviation $\sigma_{pr}$ to best fit the shape of the pressing value frequency distribution. The Gaussian distribution $N(\mu_{to}, \sigma_{to}^2)$ obtained as above represents the pressing value frequency distribution of normal touch operations, and $\mu_{pr}$ can be regarded as representing the threshold value in the present state.

Incidentally, when an operation like the stroking operation or the flick operation is not obtained in the search for $\mu_{up}$, the threshold value determination unit 106 may make the search based on the average value of all touch operations taking into account the fact that the frequency of the normal touch operation is higher. The threshold value determination unit 106 updates the threshold value according to the following expression (1) based on the Gaussian distribution $N(\mu_{to}, \sigma^2_{to})$ of the normal touch operation and $\mu_{pr}$ of the depressing operation:

$$\text{(threshold value)}=(1-W)\times\text{(threshold value updated last time)}+V\times W\times(\mu_{pr}-P\times\sigma_{pr})+(1-V)\times W\times(\mu_{to}+3\sigma_{to}) \quad (1).$$

W is a weight coefficient that represents reliability of distribution and becomes equal to 1.0 when $N(\mu_{to}, \sigma^2_{to})+N(\mu_{pr}, \sigma^2_{pr})$ coincides with the obtained frequency distribution. When the frequency distribution can be described by a Gaussian distribution without error, the threshold value determination unit 106 determines a new threshold value by using values of the frequency distribution.

V is a weight coefficient that represents reliability of $\mu_{pr}$. The weight coefficient V takes on a smaller value with the increase in the difference between the (threshold value updated last time) and the value of $\mu_{pr}$ and with the increase in the value of the standard deviation $\sigma_{pr}$.

The term $(-P\times\sigma_{pr})$ is a parameter for preventing a situation in which the user performs depressing operations more strongly due to the depressing operation threshold value updated to a higher value, $\mu_{pr}$ becomes a large value due to the strong depressing operations by the user, and the threshold value becomes excessively high in the next threshold value update. P is a positive coefficient.

By updating $(\mu_{to}+3\sigma_{to})$, unintended execution of a depressing operation based on operation logs of normal touch operations is avoided.

It is also possible to use a value $(\sigma\mu_{to}+3\sigma_{to})$, in which $\mu_{to}$ is previously multiplied by a predetermined multiplier $\alpha$, instead of $(\mu_{to}+3\sigma_{to})$. Here, $\alpha$ is a coefficient previously obtained experimentally.

The expression (1) is an example of the method of determining the threshold value, and it is possible to modify the expression (1) based on the shape of the frequency distribution of operation logs.

In the step ST6 in FIG. 10, when the frequency value of $\mu_{pr}$ in the frequency distribution of operation logs does not differ from a frequency value obtained from the Gaussian distribution $N(\mu_{to}, \sigma^2_{to})$ by a fixed frequency or more (i.e., when existence of a plurality of Gaussian distributions is not recognized), the threshold value determination unit 106 considers that operation logs of normal touch operations or operation logs of depressing operations are not included in the frequency distribution. Thus, at the time of the next region judgment, the threshold value determination unit 106 judges whether the operation log is an operation log of a normal touch operation or an operation log of a depressing operation.

Figure 14A:
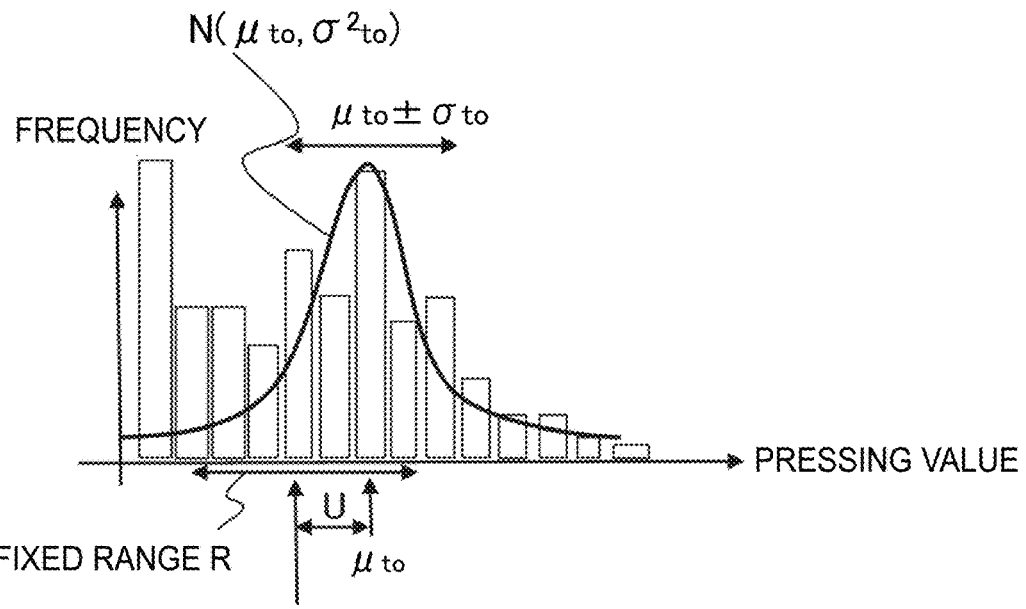
FIGS. 14A and 14B are diagrams showing frequency distributions of the pressing value.
Figure 14B:
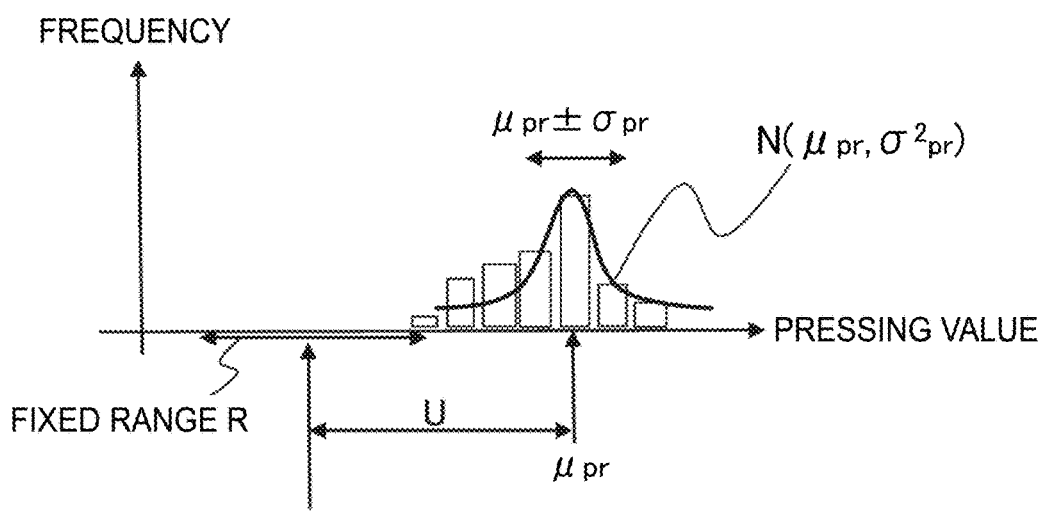

First, when there exists an operation log of a stroking operation or a flick operation in a group region, the threshold value determination unit 106 compares the average value of the pressing value of that operation with a pressing value whose frequency distribution is the maximum. When the difference U between these values is within a predetermined fixed value (i.e., within a fixed range R) as shown in FIG. 14A, the threshold value determination unit 106 regards the operation log at that time as an operation log of a normal touch operation. When the difference U exceeds the fixed value (i.e., outside the fixed range R) as shown in FIG. 14B, the threshold value determination unit 106 regards the operation log as an operation log of a depressing operation.

When the obtained frequency distribution is judged to be frequency distribution of operation logs of normal touch operations, the threshold value determination unit 106 updates the depressing operation threshold value according to the following expression (2) obtained by substituting V=0 into the expression (1):

$$\text{(threshold value)}=(1-W)\times\text{(threshold value updated last time)}+W\times(\mu_{to}+3\sigma_{to}) \quad (2).$$

When the obtained frequency distribution is judged to be frequency distribution of operation logs of depressing operations, the threshold value determination unit 106 assumes that $\mu_{pr}=\mu_{to}$ and updates the depressing operation threshold value according to the following expression (3):

$$\text{(threshold value)}=(1-W)\times\text{(threshold value updated last time)}+W\times\mu_{pr} \quad (3).$$

When it cannot be judged whether the frequency distribution of stroking operations and flick operations is frequency distribution of which operation logs, the threshold value determination unit 106 does not update the depressing operation threshold value.

(Step ST7)

When group regions have been generated automatically by means of clustering, there is a possibility that a sufficient number of operation logs have not been accumulated in some group regions. Therefore, in step ST7 in FIG. 10, the threshold value determination unit 106 may incorporate the amount of update of the threshold value in another group region into the threshold value update of such group regions in which a sufficient number of operation logs have not been obtained. For example, let L represent the distance between group regions, the threshold value determination unit 106 prescribes an influence level F(L) regarding each group region as the following expression (4):

$$F(L)=K\times\exp(-(L-A)2/B) \quad (4).$$

Here, A, B and K are parameters. The parameters can be obtained experimentally. The influence level F(L) decreases with the increase in the distance L. The maximum value of the influence level F(L) is 1.0.

For example, for a group region in which an operation log of a stroking operation or a flick operation is not obtained and it cannot be judged whether the operation logs are operation logs of normal touch operations or operation logs of depressing operations or a group region in which reliability of a certain level or higher has not been obtained regarding the frequency distribution due to a small number of operation logs, the threshold value determination unit 106 obtains the distance L to another group region situated at the closest position and updates the depressing operation threshold value according to the following expression (5):

$$\text{(threshold value)}=(1-F(L))\times\text{(threshold value updated last time)}+F(L)\times\text{(threshold value in closest group region)} \quad (5).$$

As described above, by using the touch panel device 1, the operation identification method and the operation identification program according to the first embodiment, the depressing operation threshold value in a touch panel device for an industrial purpose used in a variety of environment can be adjusted automatically by dynamically generating group regions based on operation logs.

(2) Second Embodiment

The touch panel device 1 according to the first embodiment estimates group regions corresponding to operation regions based on operation logs of touch operations performed on the touch panel 20, obtains the frequency distribution of the pressing value in each group region, and updates the depressing operation threshold value based on the obtained frequency distribution. In contrast, a touch panel device 2 according to a second embodiment increases the accuracy of the estimation of the operation regions by using object information indicating objects constituting a GUI (Graphical User Interface) as the UI screen displayed on the display device 50. Here, the objects constituting the GUI are operation components such as icons.

Figure 15:
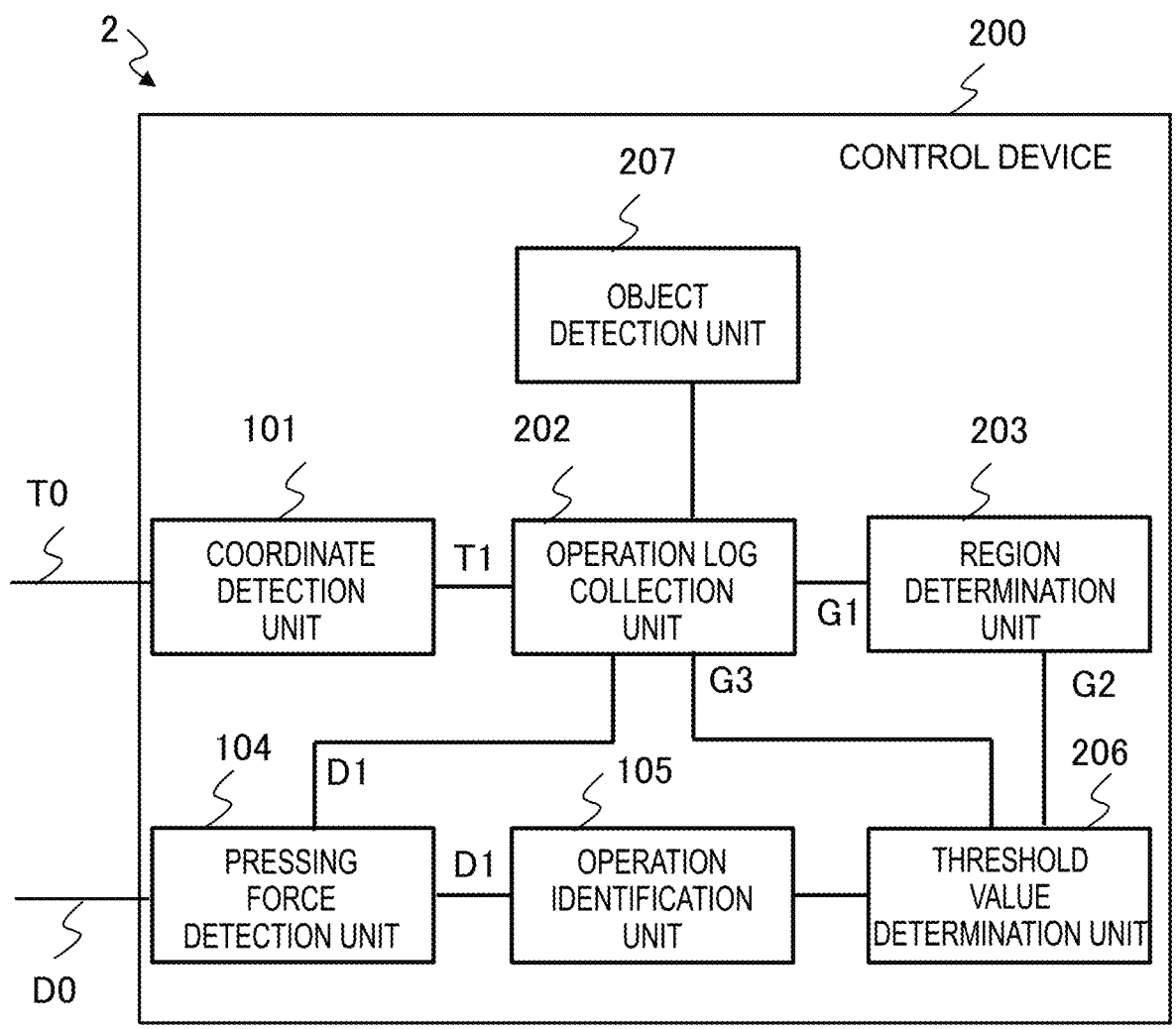
FIG. 15 is a functional block diagram schematically showing the configuration of a touch panel device according to a second embodiment of the present disclosure.

FIG. 15 is a functional block diagram schematically showing the configuration of the touch panel device 2 according to the second embodiment. In FIG. 15, each component identical or corresponding to a component shown in FIG. 5 is assigned the same reference character as in FIG. 5. The touch panel device 2 according to the second embodiment differs from the touch panel device 1 according to the first embodiment in that a control device 200 includes an object detection unit 207. Further, the touch panel device 2 according to the second embodiment differs from the touch panel device 1 according to the first embodiment in processes executed by an operation log collection unit 202, a region determination unit 203 and a threshold value determination unit 206.

The object detection unit 207 acquires information on operation regions of objects each time the transition of the UI screen is executed. When the touch coordinates acquired from the coordinate detection unit 101 are in an operation region acquired by the object detection unit 207, the operation log collection unit 202 stores the touch operation while associating the touch operation with an object. The contents of the stored operation log are the same as those described in the explanation of the step ST4 in FIG. 10.

After objects and operation logs are associated with each other, the threshold value determination unit 206 determines the depressing operation threshold value. In the determination of the depressing operation threshold value, if the depressing operation threshold value is determined for each object, the operability of an operation button as an object hardly operated can become unstable. Therefore, after collecting a predetermined fixed number of operation logs or more, the operation log collection unit 202 regards operation logs associated with an object as one group and executes the clustering in the same way as the step ST5 in FIG. 10. The operation log collection unit 202 stores the groups obtained by the clustering and the objects while associating them with each other.

After the group regions are generated by the clustering, the threshold value determination unit 206 sets the depressing operation threshold value in the same way as the step ST6 in FIG. 10. For group regions in which a sufficient number of operation logs are not obtained even by executing the clustering, the threshold value determination unit 206 updates the depressing operation threshold value by using the threshold value of the closest group region in the same way as the step ST7 in FIG. 10.

Incidentally, it is also possible for the object detection unit 207 to not only acquire the information on the operation regions of the objects on the UI screen but also acquire information on whether each object is an object dealing with depressing operations or an object dealing with normal touch operations. It is expected that operation logs having frequency distribution like that shown in FIG. 11A are obtained in cases of an object dealing exclusively with normal touch operations and operation logs having frequency distribution like that shown in FIG. 11B are obtained in the object's region in cases of an object dealing exclusively with depressing operations. In this case, the threshold value determination unit 206 can determine the depressing operation threshold value assuming that the number of group regions is one without considering the state of FIG. 12 being a case of overlapping of a plurality of distributions described in the step ST7 in FIG. 10.

As described above, by using the touch panel device 2, the operation identification method and the operation identification program according to the second embodiment, the accuracy of the estimation of the operation regions can be increased by using the object information indicating the objects displayed on the display device 50.

Except for the above-described features, the second embodiment is the same as the first embodiment.

(3) Third Embodiment

On a touch panel device for an industrial purpose, there are cases where a specific pattern of touch operation is performed repeatedly. Such an operation is referred to as a "flow operation". The flow operation is frequently performed mainly by users skilled in operations. The flow operation tends to be performed with pressing force different from pressing force in operations other than the flow operation.

For example, there are cases where the user executes a variety of setting work by successively performing two touch operations on the touch panel device and performs a depressing operation, for making the device incorporate the contents of the setting, multiple times after the completion of the setting work. Since the threshold value is updated by a depressing operation, it is presumed that the threshold value at the time of performing the final depressing operation becomes smaller than an average pressing value of depressing operations. If the depressing operation threshold value has been set at a relatively high value, it becomes necessary for the user to perform the depressing operation with pressing force stronger than expected, and thus it is presumed that redoing the depressing operation becomes necessary. In such cases, the operability deteriorates and the working efficiency drops.

Therefore, in a touch panel device 3 according to a third embodiment, the threshold value determination unit detects a flow operation, and at the time of the flow operation, updates the depressing operation threshold value to a threshold value suitable for the flow operation.

Figure 16:
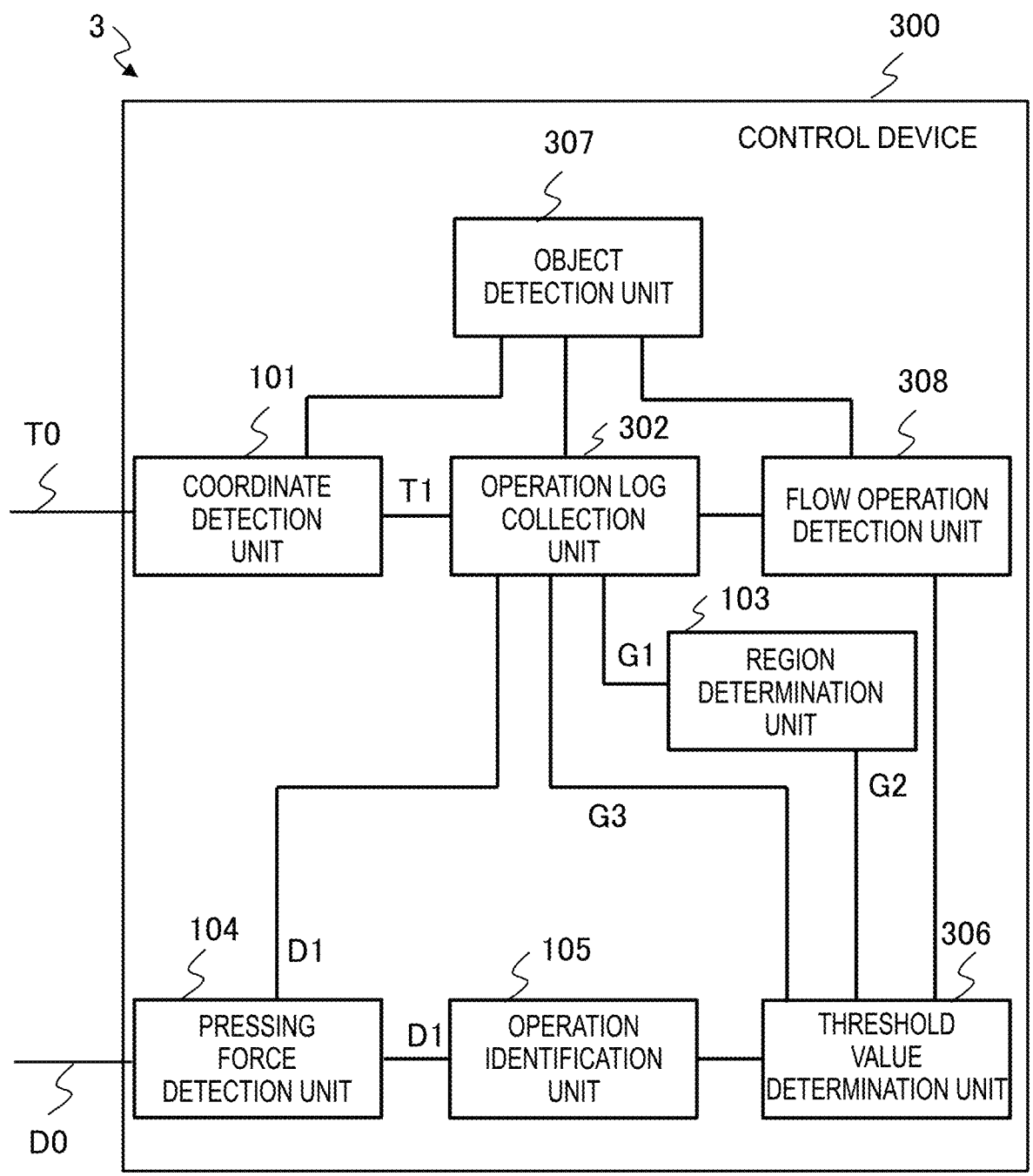
FIG. 16 is a functional block diagram schematically showing the configuration of a touch panel device according to a third embodiment of the present disclosure.

FIG. 16 is a functional block diagram schematically showing the configuration of the touch panel device 3 according to the third embodiment. In FIG. 16, each component identical or corresponding to a component shown in FIG. 15 is assigned the same reference character as in FIG. 15. The touch panel device 3 according to the third embodiment differs from the touch panel device 2 according to the second embodiment in that a control device 300 includes a flow operation detection unit 308. Further, the touch panel device 3 according to the third embodiment differs from the touch panel device 2 according to the second embodiment in processes executed by an operation log collection unit 302 and a threshold value determination unit 306.

In FIG. 16, the flow operation detection unit 308 detects the flow of operations and variations in the pressing value at the time of a flow operation based on the operation logs stored in the operation log collection unit 302 and operation region data detected by an object detection unit 307, and sends a command to the threshold value determination unit 306 to appropriately lower the final threshold value. The method of lowering the depressing operation threshold value due to the flow operation is, for example, any one of the following methods 1 to 3:

In the method 1, the threshold value determination unit 306 refers to the pressing values of H touch operations immediately before the time of the flow operation and determines the new threshold value by using a difference from the average value of the pressing values.

(new threshold value)=(average of pressing values of immediately previous H normal touch operations)+$\alpha$.

Here, $\alpha$ is a value previously determined by an experiment or the like, and H is a positive integer.

In the method 2, the threshold value determination unit 306 refers to the pressing values of H normal touch operations immediately before the time of the flow operation and determines the depressing operation threshold value by estimating the final pressing value based on the variations in the pressing value.

In the method 3, the threshold value determination unit 306 calculates the distribution of pressing values of depressing operations at times of flow operations based on operation logs and obtains the tendency of the distribution, namely, $\mu$, $3\sigma$ and the Weibull distribution.

As described above, by using the touch panel device 3, the operation identification method and the operation identification program according to the third embodiment, high operability can be realized since the depressing operation threshold value is lowered when a flow operation is detected.

Except for the above-described features, the third embodiment is the same as the second embodiment.

(4) Fourth Embodiment

When using a plurality of objects for depressing operations, the user using the touch panel device 2 according to the second embodiment can become at a loss how high pressing value is necessary for each object. Further, when the user wants to change the depressing operation threshold value, there are cases where the user cannot figure out to what level the threshold value should be set. Therefore, a touch panel device 4 according to a fourth embodiment displays the pressing value, an operation count regarding each pressing value as operation history records of each object, the frequency distribution, the depressing operation threshold value, and so forth on an indicator when an operation region on the operation surface 21 is pressed.

Figure 17:
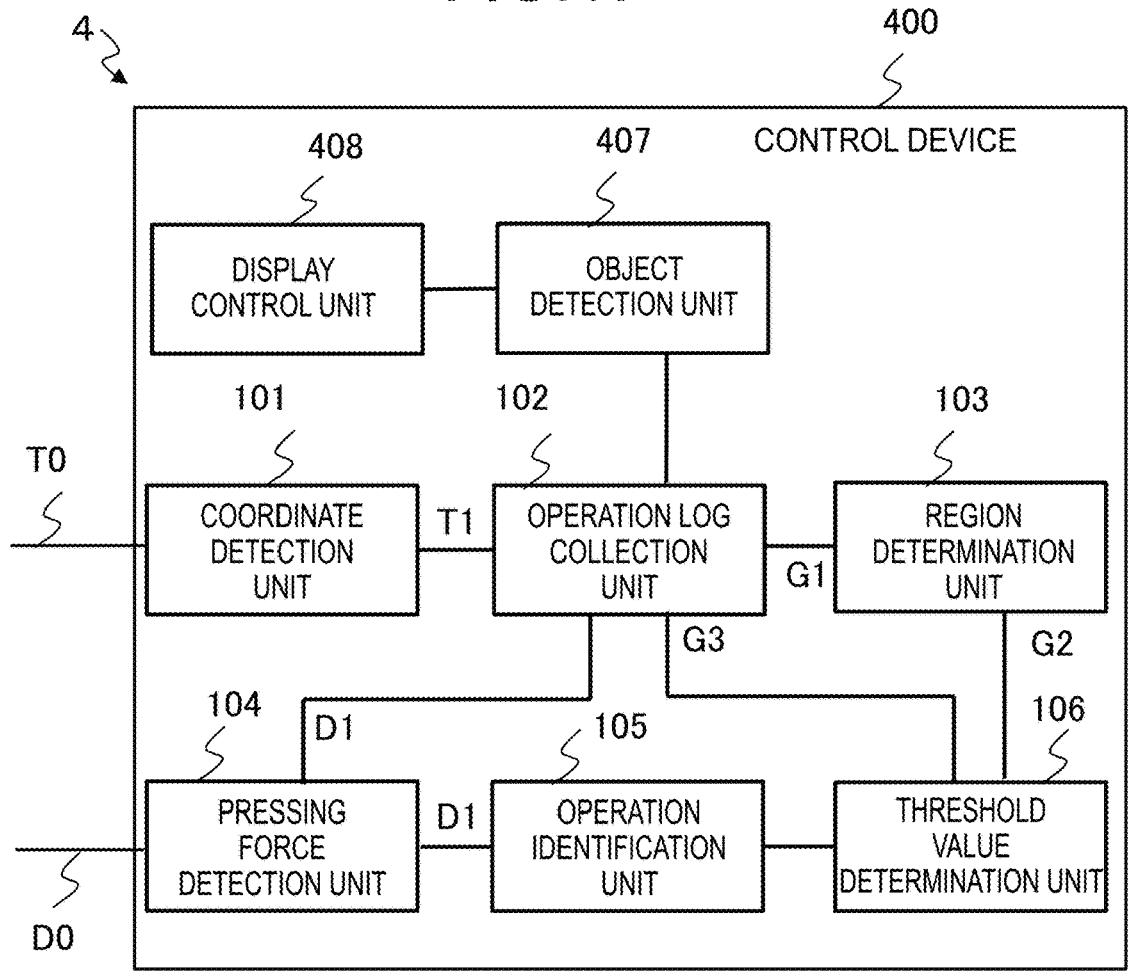
FIG. 17 is a functional block diagram schematically showing the configuration of a touch panel device according to a fourth embodiment of the present disclosure.

FIG. 17 is a functional block diagram schematically showing the configuration of the touch panel device 4 according to the fourth embodiment. In FIG. 17, each component identical or corresponding to a component shown in FIG. 15 is assigned the same reference character as in FIG. 15. The touch panel device 4 according to the fourth embodiment differs from the touch panel device 2 according to the second embodiment in that a control device 400 includes a display control unit 408 as a depression indicator display unit and an object detection unit 407.

Figure 18:
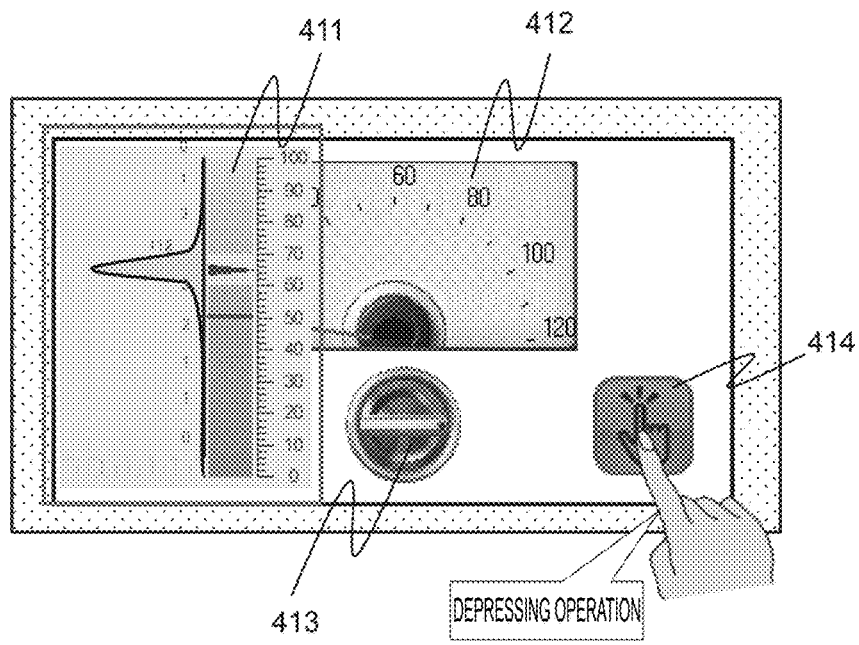
FIG. 18 is a diagram showing an example of the UI screen.
Figure 19:
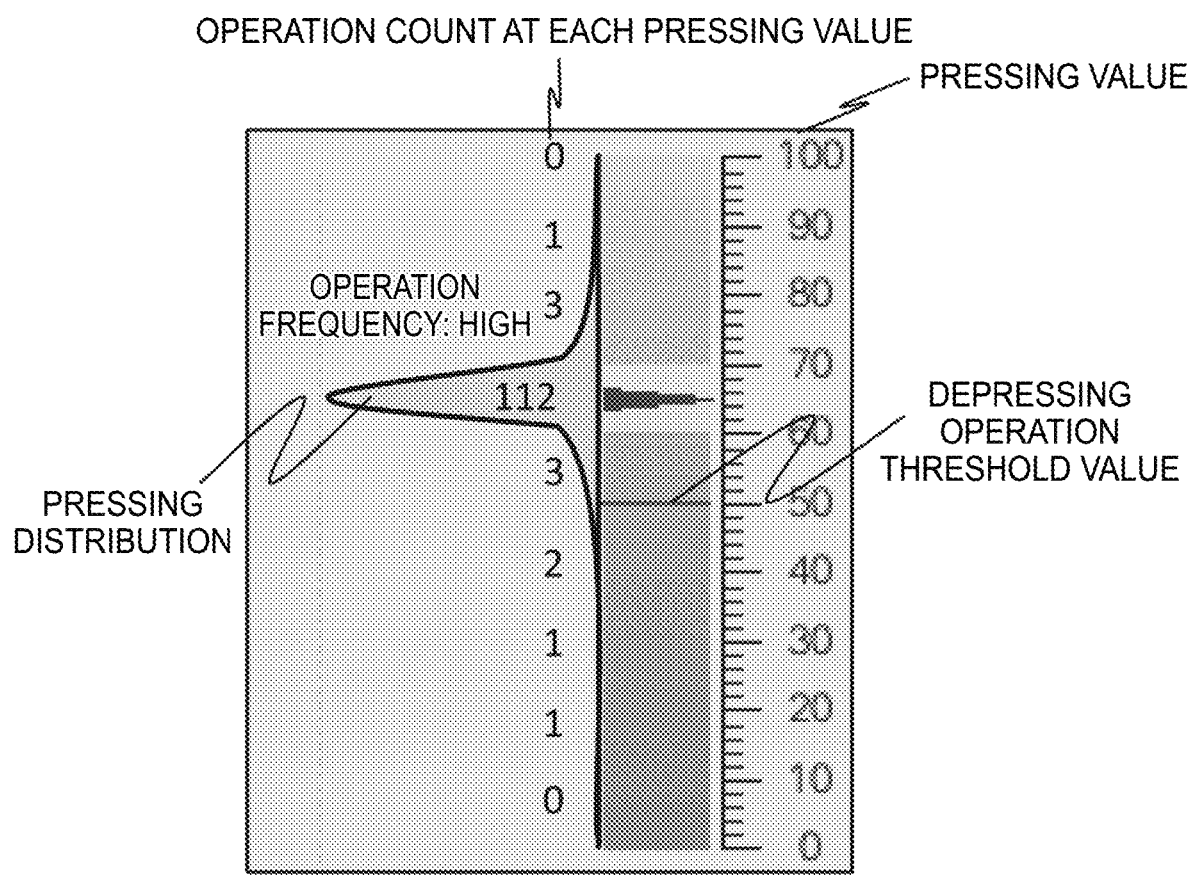
FIG. 19 is a diagram showing an example of the UI screen.

FIG. 18 and FIG. 19 are diagrams showing examples of the UI screen. As shown in FIG. 18, the UI screen includes display objects 411 and 412 for displaying set values, an object 413 for inputting a normal touch operation, and an object 414 for inputting a depressing operation. In the touch panel device 4, while the object 414 for inputting a depressing operation is pressed, an indicator showing the pressing value, the operation count regarding each pressing value as operation history records of each object, the frequency distribution and the depressing operation threshold value is displayed on the display device 50 (i.e., on the touch panel 20).

As described above, by using the touch panel device 4, the operation identification method and the operation identification program according to the fourth embodiment, high operability can be realized since the user when using a plurality of objects for depressing operations can learn the depressing operation threshold value thanks to the indicator display.

Except for the above-described features, the fourth embodiment is the same as the second embodiment.

(5) Fifth Embodiment

The touch panel devices 1 to 3 according to the first to third embodiments require a great number of operations by the user in order to collect a sufficient number of operation logs. Thus, a certain length of time is necessary until the update of the depressing operation threshold value is repeated and the threshold value reaches an appropriate value. To reduce the time until the threshold value reaches an appropriate value, it is possible to perform an experiment by use of a prior model, a simulation of a prior model, or the like and set the depressing operation threshold value based on the result of the experiment, simulation or the like. However, it is difficult to appropriately set the depressing operation threshold value by use of the prior model alone since the appropriate threshold value of the depressing operation varies depending on the actual environment in which the touch panel device is installed. Further, the appropriate value of the depressing operation threshold value can vary due to individual differences among the products.

Therefore, a touch panel device 5 according to a fifth embodiment displays a special-purpose calibration screen at the time of the initial startup after the product shipment, collects operation logs by using the calibration screen, and determines the depressing operation threshold value by using the collected operation logs.

Further, the touch panel device 5 according to the fifth embodiment may have a function of previously obtaining a normal distribution of the pressing value by an experiment or the like, comparing the distribution obtained by the experiment with a distribution detected by using the special-purpose calibration screen, and executing a check on whether the product has a failure or not or issuing an alarm to the user when the distributions excessively differ from each other.

Figure 20:
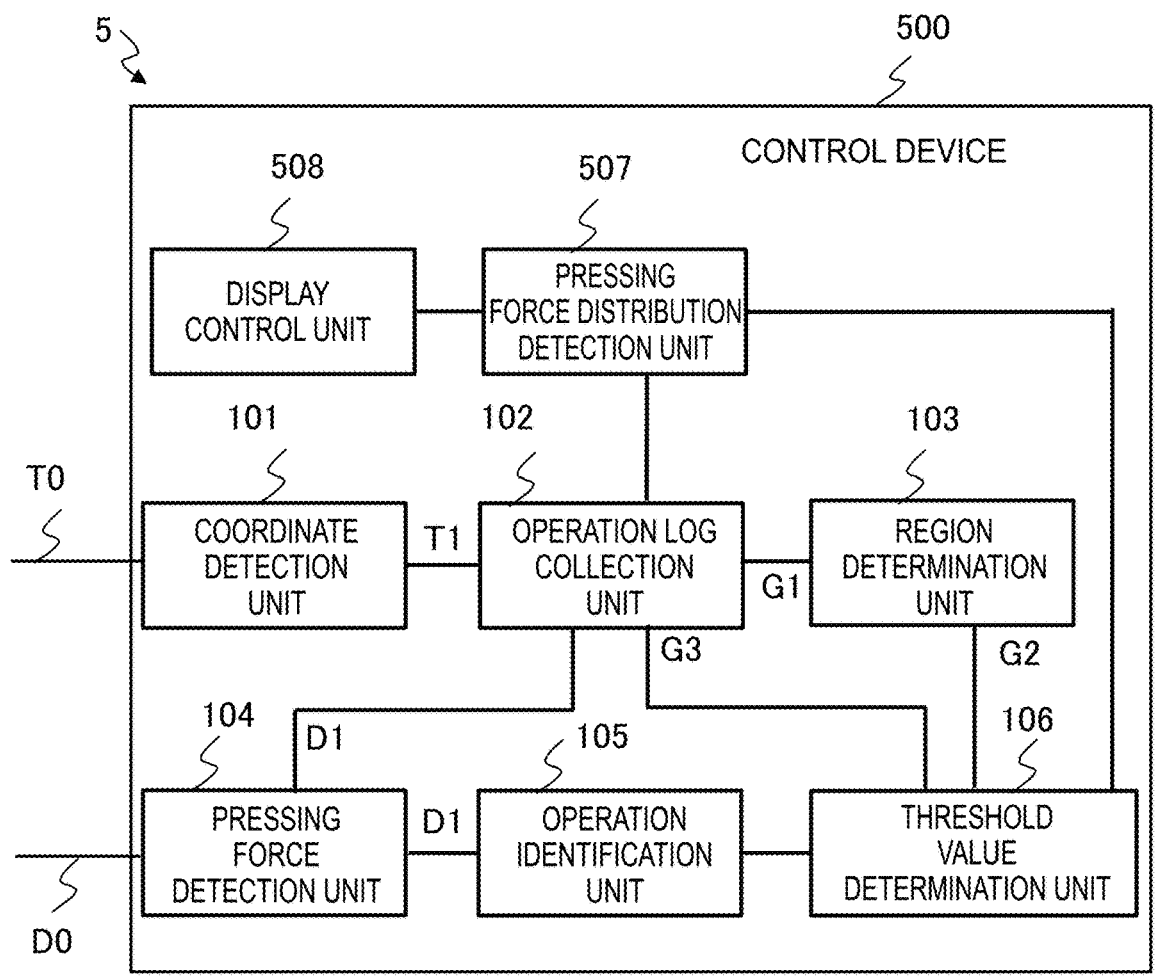
FIG. 20 is a functional block diagram schematically showing the configuration of a touch panel device according to a fifth embodiment of the present disclosure.

FIG. 20 is a functional block diagram schematically showing the configuration of the touch panel device 5 according to the fifth embodiment. In FIG. 20, each component identical or corresponding to a component shown in FIG. 5 is assigned the same reference character as in FIG. 5. The touch panel device 5 according to the fifth embodiment differs from the touch panel device 1 according to the first embodiment in that a control device 500 includes a pressing force distribution detection unit 507 and a display control unit 508.

Upon the initial startup of the product, the pressing force distribution detection unit 507 sends a control signal for prompting the calibration to the display control unit 508. The display control unit 508 has the calibration screen displayed on the display device 50. Data inputted to the operation log collection unit 102 due to touch operations on the calibration screen are detected by the pressing force distribution detection unit 507 and sent to the threshold value determination unit 106. Specifically, the pressing force distribution detection unit 507 provides the threshold value determination unit 106 with sensitivity distribution data obtained by the calibration in the step ST4 in FIG. 10. Incidentally, the pressing force distribution detection unit 507 is capable of having the calibration screen displayed in response to the user's command even besides the time of the initial startup.

Figure 21:
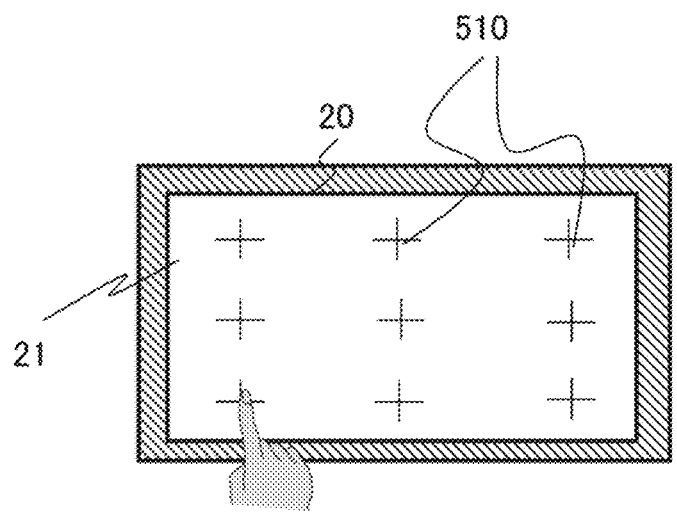
FIG. 21 is a diagram showing an example of the UI screen.

FIG. 21 is a diagram showing an example of the calibration screen as a UI screen. The calibration screen includes a plurality of touch operation objects 510 to be used for performing touch operations. The touch operation objects 510 can be objects for depressing operations. The number and the arrangement of the touch operation objects 510 are not limited to the example shown in FIG. 21. The user performs the normal touch operation or the depressing operation on each object 510. The pressing force distribution detection unit 507 performs verification of the obtained pressing value based on frequency distributions of the pressing value previously held for each object 510 like those shown in FIGS. 14A and 14B. For example, the pressing force distribution detection unit 507 checks whether or not the pressing value of the user's normal touch operation is within the $(\mu_{to} \pm \sigma_{to})$ range shown in FIG. 14A and checks whether or not the pressing value of the user's depressing operation is within the $(\mu_{pr} \pm \sigma_{pr})$ range shown in FIG. 14B.

When the pressing value is not within the predetermined range, the pressing force distribution detection unit 507 notifies the display control unit 508 of a request for inputting again. The pressing force distribution detection unit 507 repeats the normal touch operation or the depressing operation a predetermined number of times. When the pressing value of the normal touch operation is not within the $(\mu_{to} \pm \sigma_{to})$ range and the pressing value of the depressing operation is not within the $(\mu_{pr} \pm \sigma_{pr})$ range, the pressing force distribution detection unit 507 has a warning displayed on the display device 50 through the display control unit 508. This warning is the following message, for example: "Depressing operation threshold value will be determined automatically, OK?"

When the answer to the warning is "YES", the threshold value determination unit 106 determines the depressing operation threshold value based on the pressing value of the normal touch operation and the pressing value of the depressing operation obtained by using the calibration screen. When the answer to the warning is "NO", the pressing force distribution detection unit 507 displays the calibration screen again and makes the user perform the depressing operation some times, and the threshold value determination unit 106 determines the depressing operation threshold value based on the pressing values at that time.

Next, when the pressing value of the normal touch operation is within the $(\mu_{to} \pm \sigma_{to})$ range whereas the pressing value of the depressing operation is not within the $(\mu_{pr} \pm \sigma_{pr})$ range, the pressing force distribution detection unit 507 issues a message depending on magnitude relationship regarding the user's depressing operation. When the pressing value of the depressing operation is high, the pressing force distribution detection unit 507 has the following message displayed, for example:

"Depressing operation can have been performed by pressing too strongly. Reset depressing operation threshold value to be responded only when pressing strongly?"

When the pressing value of the depressing operation is low, the pressing force distribution detection unit 507 has the following message displayed, for example:

"Depressing operation can have been performed by pressing more weakly than supposed. Reset depressing operation threshold value to be responded only when pressing weakly?"

When the answer to this message is "YES", the threshold value determination unit 106 sets the average value of the pressing force of the depressing operations as the new threshold value. When the answer to this message is "NO", the threshold value determination unit 106 sets the average value $\mu_{pr}$ as the depressing operation threshold value.

When the pressing value of the depressing operation is within the $(\mu_{pr} \pm \sigma_{pr})$ range whereas the pressing value of the normal touch operation is not within the $(\mu_{to} \pm \sigma_{to})$ range, the pressing force distribution detection unit 507 has the following message displayed:

"Normal touch operation seems to have been performed with load lower than supposed. Although threshold value of depressing operation is close to recommended value, adjust threshold value based on normal touch operations?"

or

"Normal touch operation seems to have been performed stronger than supposed. Although threshold value of depressing operation is close to recommended value, adjust threshold value based on normal touch operations?"

When the answer to this message is "YES", the threshold value determination unit 106 sets (an average value of pressing values of normal touch operations+$3\sigma_{to}$) as the depressing operation threshold value.

As described above, by using the touch panel device 5, the operation identification method and the operation identification program according to the fifth embodiment, whether the installation environment is exactly as supposed or not can be checked before the use of the device by displaying the calibration screen.

Further, by using the touch panel device 5, the operation identification method and the operation identification program according to the fifth embodiment, the threshold value of the pressing value of the touch operation can be prevented from being set at an excessively small or excessively large value.

Furthermore, by using the touch panel device 5, the operation identification method and the operation identification program according to the fifth embodiment, the depressing operation threshold value can be set at an appropriate value even before a sufficient number of operation logs are accumulated.

Moreover, by using the touch panel device 5, the operation identification method and the operation identification program according to the fifth embodiment, the threshold value of the pressing value at the time of the initial startup may be switched depending on installation environment such as side mounting, compression mounting or vertical setting.

In addition, it is basically desirable for the operation log collection unit 102 to collect normal touch operations or depressing operations, touching coordinates within a certain range without moving for a certain period and then pulling away from the touch panel, as operation logs. However, it is also possible for the operation log collection unit 102 to make the user perform stroking operations or flick operations, besides repeating the normal touch operation a great number of times, and collect the pressing values of the stroking operations or flick operations as operation logs.

Except for the above-described features, the fifth embodiment is the same as the first embodiment.

(6) Modification

It is possible to appropriately combine the configurations of the touch panel devices 1 to 5 in the above first to fifth embodiments.

DESCRIPTION OF REFERENCE CHARACTERS 1-5: touch panel device, 20: touch panel, 21: operation surface, 30: pressure sensor unit, 30a-30d: pressure sensor, 31: support part, 41: processor, 42: memory, 50: display device, 80: finger, 100, 200, 300, 400, 500: control device, 101: coordinate detection unit, 102, 202, 302: operation log collection unit, 103, 203, 303: region determination unit, 104: pressing force detection unit, 105: operation identification unit, 106, 206, 306: threshold value determination unit, 107: operation judgment unit, 207, 307, 407: object detection unit, 308: flow operation detection unit, 408, 508: display control unit, 507: pressing force distribution detection unit.

What is claimed is:

1. A touch panel device comprising:
processing circuitry
to generate coordinate information indicating a position of a touch operation performed on an operation surface of a touch panel based on a signal outputted from the touch panel due to the touch operation;
to generate a pressing value corresponding to pressing force applied to the operation surface of the touch panel by the touch operation;
to collect and store operation logs each including the coordinate information and information indicating the pressing value of a corresponding touch operation;
to classify, when a fixed number of touch points, each corresponding to a position where a touch operation was performed, has been stored in the operation logs, the positions of a plurality of touch operations included in operation logs into a plurality of groups and to determine group regions respectively corresponding to the plurality of groups;
to determine a threshold value of the pressing value in each of the plurality of group regions based on the operation logs; and
to judge that the touch operation is a depressing operation with pressing force if the pressing value is greater than or equal to the threshold value and to judge that the touch operation is a normal touch operation other than the depressing operation if the pressing value is less than the threshold value.

2. The touch panel device according to claim 1, wherein the processing circuitry classifies the positions of the plurality of touch operations included in the operation logs into the plurality of groups by means of clustering.

3. The touch panel device according to claim 1, wherein the processing circuitry detects a flow operation as a repetition of a specific pattern of touch operation, and when the flow operation is detected, the processing circuitry determines the threshold value based on the pressing value of a normal touch operation immediately before the flow operation.

4. The touch panel device according to claim 1, wherein the processing circuitry
detects an object on a user interface screen displayed on a display device, and
stores operation logs in each of which the object is associated with the coordinate information and the information indicating the pressing value in the storage.

5. The touch panel device according to claim 1, wherein the processing circuitry makes a display device display a user interface screen and detects an object on the user interface screen, and
an indicator, showing one or more of the pressing value regarding the object, a count of operations on the object, frequency distribution of the pressing value and the threshold value of the depressing operation, is displayed on the display device.

6. The touch panel device according to claim 1, wherein the processing circuitry
makes a display device display a calibration screen;
detects data inputted to the storage due to a touch operation on the calibration screen, and
sets the threshold value based on a touch operation on the calibration screen.

7. The touch panel device according to claim 1, wherein when a number of operation logs has not reached a predetermined value in each of the plurality of group regions, the processing circuitry updates the threshold value in the group region by using an amount of update of another threshold value in another group region.

8. An operation identification method comprising:
generating coordinate information indicating a position of a touch operation performed on an operation surface of a touch panel based on a signal outputted from the touch panel due to the touch operation;
generating a pressing value corresponding to pressing force applied to the operation surface of the touch panel by the touch operation;
collecting and storing operation logs each including the coordinate information and information indicating the pressing value of a corresponding touch operation;
classifying, when a fixed number of touch points each corresponding to a position where a touch operation was performed has been stored in the operation logs, the positions of a plurality of touch operations included in the operation logs into a plurality of groups and determining group regions respectively corresponding to the plurality of groups;
determining a threshold value of the pressing value in each of the plurality of group regions based on the operation logs; and
judging that the touch operation is a depressing operation with pressing force if the pressing value is greater than or equal to the threshold value and judging that the touch operation is a normal touch operation other than the depressing operation if the pressing value is less than the threshold value.

9. A non-transitory computer-readable storage medium for storing an operation identification program that causes a computer to execute processing comprising:
generating coordinate information indicating a position of a touch operation performed on an operation surface of a touch panel based on a signal outputted from the touch panel due to the touch operation;

generating a pressing value corresponding to pressing force applied to the operation surface of the touch panel by the touch operation;

collecting and storing operation logs each including the coordinate information and information indicating the pressing value of a corresponding touch operation;

classifying, when a fixed number of touch points each corresponding to a position where a touch operation was performed has been stored in the operation logs, the positions of a plurality of touch operations included in the operation logs into a plurality of groups and determining group regions respectively corresponding to the plurality of groups;

determining a threshold value of the pressing value in each of the plurality of group regions based on the operation logs; and judging that the touch operation is a depressing operation with pressing force if the pressing value is greater than or equal to the threshold value and judging that the touch operation is a normal touch operation other than the depressing operation if the pressing value is less than the threshold value.

* * * * *